United States Patent
Harrison et al.

(10) Patent No.: US 12,143,176 B2
(45) Date of Patent: Nov. 12, 2024

(54) DFT-S-OFDM MULTIPLE LAYER AND SUBBAND TRANSMISSION

(71) Applicant: Telefonaktiebolaget LM Ericsson (PUBL), Stockholm (SE)

(72) Inventors: Robert Mark Harrison, Grapevine, TX (US); Ling Su, Beijing Hebei (CN); Zhipeng Lin, Nanjing Jiangsu (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/040,296

(22) PCT Filed: Aug. 6, 2021

(86) PCT No.: PCT/IB2021/057278
§ 371 (c)(1),
(2) Date: Feb. 2, 2023

(87) PCT Pub. No.: WO2022/029717
PCT Pub. Date: Feb. 10, 2022

(65) Prior Publication Data
US 2024/0297690 A1  Sep. 5, 2024

(30) Foreign Application Priority Data
Aug. 6, 2020 (WO) ............... PCT/CN2020/107307

(51) Int. Cl.
*H04B 7/04* (2017.01)
*H04B 7/0456* (2017.01)
*H04B 7/06* (2006.01)

(52) U.S. Cl.
CPC ........... *H04B 7/046* (2013.01); *H04B 7/0639* (2013.01); *H04B 7/0691* (2013.01)

(58) Field of Classification Search
CPC ..... H04B 7/046; H04B 7/0639; H04B 7/0691
(Continued)

(56) References Cited

U.S. PATENT DOCUMENTS

| | | | | |
|---|---|---|---|---|
| 2020/0367217 | A1* | 11/2020 | Wang | H04L 5/0094 |
| 2021/0105724 | A1* | 4/2021 | Huang | H04W 52/365 |
| 2023/0336223 | A1* | 10/2023 | Park | H04L 5/0051 |

FOREIGN PATENT DOCUMENTS

WO  2019 029480 A1  2/2019

OTHER PUBLICATIONS

3GPP TS 38.211 v2.0.0; 3rd Generation Partnership Project; Technical Specification Group Radio Access Network; NR; Physical channels and modulation (Release 15)—Dec. 2017.
(Continued)

*Primary Examiner* — Emmanuel Bayard

(57) ABSTRACT

According to some embodiments, a method performed by a wireless device for transmitting multiple layers of an uplink physical channel comprises transmitting to a network node an indication of a capability to operate according to a first mode of operation and a second mode of operation. In the first mode a codebook subset comprises precoding matrices with at most one non-zero elements per column, and in the second mode the codebook subset comprises precoding matrices with at most two non-zero elements per column. The codebook subset is in a codebook for use when transform precoding of a physical channel is disabled. The method further comprises receiving a configuration from the network node for a selected mode of operation, and transmitting the physical channel using transform precoding and, at least when transmitting with two layers, using the codebook subset comprising the precoding matrices of the selected mode.

19 Claims, 19 Drawing Sheets

(58) Field of Classification Search
USPC .......................................... 375/267, 299, 347
See application file for complete search history.

(56) References Cited

OTHER PUBLICATIONS

PCT Notification of Transmittal of the International Search Report and the Written Opinion of the International Searcing Authority, or the Declaration issued for International application No. PCT/IB2021/057278—Jan. 4, 2022.

* cited by examiner

1050

1052 – receive signaling identifying a first and a second subband, wherein the subbands contain contiguous frequency domain resources, and at least a portion of the frequency domain resources of one of the subbands is not contained within the other subband 1054 – receive an allocation of frequency domain resources for the first subband that indicate a starting PRB index and a number of contiguous PRBs and determining frequency domain resources for the second subband by adding an integer offset to the starting PRB index 1056 – encode and map a set of information bits to the first and the second subband, thereby forming one or more spatial layers according to a mapping of a plurality of antenna ports to the one or more spatial layers 1058 – transmit the one or more spatial layers in the subbands and within a same OFDM symbol

Fig. 10B

DFT-S-OFDM MULTIPLE LAYER AND SUBBAND TRANSMISSION

PRIORITY

This nonprovisional application is a U.S. National Stage Filing under 35 U.S.C. § 371 of International Patent Application Serial No. PCT/IB2021/057278 filed Aug. 6, 2021 and entitled "DFT-S-OFDM MULTIPLE LAYER AND SUBBAND TRANSMISSION" which claims priority to International Patent Application Serial No. PCT/CN2020/107307 filed Aug. 6, 2020 both of which are hereby incorporated by reference in their entirety.

TECHNICAL FIELD

Embodiments of the present disclosure are directed to wireless communications and, more particularly, to new radio (NR) multiple layer and subband transmission.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Wireless communication networks transmit and receive radio signals according to a particular waveform. Long term evolution (LTE) uses discrete Fourier transform (DFT) spread orthogonal frequency division multiplexing (OFDM) (also referred to as DFT-S-OFDM) as its only uplink waveform largely because of its superior power amplifier efficiency compared to other waveforms such as OFDM (also known as CP-OFDM). The superior power amplifier efficiency is enabled by the lower peak to average power ration (PAPR) and cubic metric (CM) of DFT-S-OFDM.

LTE uplink multiple-input multiple-output (MIMO) supports up to 4-layer transmission. Thus, LTE supports DFT-S-OFDM with 4 layers.

Fifth generation (5G) new radio (NR) supports both CP-OFDM waveform and DFT-S-OFDM waveforms in uplink. The CP-OFDM waveform can be used for a single-layer and multi-layer MIMO transmissions, while the DFT-S-OFDM based waveform is limited to single layer transmission.

In general, the NR specifications indicate that NR supports DFT-S-OFDM based waveform complementary to CP-OFDM waveform, at least for enhanced mobile broadband (eMBB) uplink for up to 40 GHz. The CP-OFDM waveform can be used for single-layer and multi-layer (i.e., MIMO) transmissions, while the DFT-S-OFDM based waveform is limited to a single layer transmissions (targeting for link budget limited cases). The network can decide and communicate to the UE which one of CP-OFDM and DFT-S-OFDM based waveforms to use. Both CP-OFDM and DFT-S-OFDM based waveforms are mandatory for user equipment (UEs).

NR supports both codebook-based uplink MIMO and non-codebook-based uplink MIMO. NR uplink MIMO supports up to 4-layer transmission.

FIG. 1 illustrates the process of codebook-based uplink MIMO in three steps. At step 1, a UE transmits one or two sounding reference signal (SRS) resources to a gNB. An SRS resource has 1, 2, or 4 ports. At step 2, the gNB determines, based on the received SRS, a preferred precoder from a codebook and indicates a transmitted precoding matrix indicator (TPMI) and transmission rank indicator (TRI) (i.e., the UE precoder matrix from a precoder codebook and rank to be applied over the ports of the SRS resource). TPMI selections takes into account UE coherence capability. The gNB may optionally send an SRS resource indicator. When two SRS resources are used, TPMI and TRI apply to the selected resource.

At step 3, the UE performs physical uplink shared channel (PUSCH) transmission using the indicated precoder.

The working procedure of uplink codebook based MIMO is as follows. A UE signals its coherence capability, either full coherence, partial coherence or non-coherence. The network configures codebook subsets by radio resource control (RRC) parameters, maxRI and codebookSubset. The network chooses TPMI from predefined transmit precoding matrix table according to UE coherency capability. The network indicates SRI, TPMI and TRI by downlink control information (DCI).

NR Rel-15 includes two uplink MIMO transmission schemes: codebook-based uplink transmission and non-codebook-based uplink transmission. In addition, Rel-15 codebook-based uplink transmission includes the concept of UE coherence capability. The reason for the coherence capability is that precoding in uplink requires that UE transmit chains have stable relative phase to enable array gain, which can be difficult due to, for example, phase variation with transmit power in multi-stage power amplifier (PA) architectures (e.g., Doherty PA) or transmit chains not all sharing the same local oscillator.

NR Rel-15 supports three levels of UE capability for uplink MIMO transmission. The first is full coherence, where all ports can be transmitted coherently. All SRS ports are assumed to have well controlled relative phase. The second is partial coherence, where port pairs can be transmitted coherently. SRS port pairs $\{0,2\}$ and $\{1,3\}$ are assumed to have well controlled relative phase. The third is non-coherence, where no port pairs can be transmitted coherently. No SRS ports are assumed to have well controlled relative phase. An example is illustrated in FIG. 2.

FIG. 2 illustrates UE coherency capabilities. From left to right, FIG. 2 illustrates full coherency, partial coherency, and non-coherency. Depending on which UE coherence capability the UE has, different subsets of the uplink codebook are available.

FIG. 3 illustrates the different subset codebook for rank 1 precoders. A fully coherent UE can be configured with all three subsets, a partially coherent UE can be configured with non-coherent and partial-coherent subsets, and non-coherent UEs can be configured with non-coherent subset.

NR specifications include precoding matrix for uplink MIMO. For CP-OFDM and DFT-S-OFDM based waveform, NR supports precoding matrix for single-layer transmission using two or four antenna ports. For CP-OFDM, NR additionally supports precoding matrix for: two-layer transmission using two or four antenna ports, three-layer transmission using four antenna ports, and four-layer transmission using four antenna ports.

Some of above precoder matrices described in chapter 6.3.1.5 in 3GPP TS 38.211 V16.2.0 are as included below.

TABLE 6.3.1.5-1

Precoding matrix W for single-layer transmission using two antenna ports.

| TPMI index | W (ordered from left to right in increasing order from TPMI index) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

TABLE 6.3.1.5-2

Precoding matrix W for single-layer tranmission using four antenna ports with transform precoding enabled.

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

TABLE 6.3.1.5-4

Precoding matrix W for two-layer transmission using two antenna ports with transform precoding disabled.

| TPMI index | W (ordered from left to right in increasing order of TPMI index) |
|---|---|
| 0-2 | $\frac{1}{\sqrt{2}}\begin{bmatrix}1 & 0\\0 & 1\end{bmatrix}$ $\frac{1}{2}\begin{bmatrix}1 & 1\\1 & -1\end{bmatrix}$ $\frac{1}{2}\begin{bmatrix}1 & 1\\j & -j\end{bmatrix}$ |

TABLE 6.3.1.5-7

Precoding matrix W for four-layer transmission using four antenna ports with transform precoding disabled.

| TPMI index | W (ordered from left to right in increasing order of TPMI index) |
|---|---|
| 0-3 | $\frac{1}{2}\begin{bmatrix}1 & 0 & 0 & 0\\0 & 1 & 0 & 0\\0 & 0 & 1 & 0\\0 & 0 & 0 & 1\end{bmatrix}$ $\frac{1}{2\sqrt{2}}\begin{bmatrix}1 & 1 & 0 & 0\\0 & 0 & 1 & 1\\1 & -1 & 0 & 0\\0 & 0 & 1 & -1\end{bmatrix}$ $\frac{1}{2\sqrt{2}}\begin{bmatrix}1 & 1 & 0 & 0\\0 & 0 & 1 & 1\\j & -j & 0 & 0\\0 & 0 & j & -j\end{bmatrix}$ $\frac{1}{4}\begin{bmatrix}1 & 1 & 1 & 1\\1 & -1 & 1 & -1\\1 & 1 & -1 & -1\\1 & -1 & -1 & 1\end{bmatrix}$ |
| 4 | $\frac{1}{4}\begin{bmatrix}1 & 1 & 1 & 1\\1 & -1 & 1 & -1\\j & j & -j & -j\\j & -j & -j & j\end{bmatrix}$ — — — |

NR may use RRC and DCI configuration of codebook subset, TPMI, and rank indicator (RI). For codebook-based transmission, the gNB configures the codebook and maximum number of layers via higher layer parameters codebookSubset and maxRank, where the codebookSubset configured by the gNB should not exceed UE reported coherency capability.

The codebookSubset is the subset of precoding matrix indicators (PMIs) addressed by TPMI, where PMIs are those supported by UEs with maximum coherence capabilities. The type is ENUMERATED {fully AndPartial AndNonCoherent, partialAndNonCoherent, nonCoherent}. The maxRank is the subset of PMIs addressed by TRIs from 1 to ULmaxRank.

Transmission precoder TPMI is used to indicate the precoder to be applied over the layers {0 ... v−1}. The gNB selects transmission precoder from the uplink codebook. TPMI and transmission rank are jointly encoded in Precoding information and member of layers field in DCI0_1 or DCI0_2.

A UE selects one of the below four tables in TS38.212 V16.2.0 based on its configuration. SRI, TPMI and the transmission rank are given by DCI fields of SRS resource indicator and Precoding information and number of layers, respectively. The UE determines TPMI and TRI based on DCI fields and the selected table.

Table 7.3.1.1.2-2: Precoding information and number of layers, for 4 antenna ports, if transform precoder is disabled and maxRank=2 or 3 or 4, and ULFPTxModes is either not configured or configured to Mode2

Table 7.3.1.1.2-2A: Precoding information and number of layers for 4 antenna ports, if transform precoder is disabled, maxRank=2, and ULFPTxModes=Mode1

Table 7.3.1.1.2-2B: Precoding information and number of layers for 4 antenna ports, if transform precoder is disabled, maxRank=3 or 4, and ULFPTxModes=Mode1

Table 7.3.1.1.2-3: Precoding information and number of layers for 4 antenna ports, if transform precoder is enabled, or if transform precoder is disabled and maxRank=1

Table 7.3.1.1.2-3A: Precoding information and number of layers for 4 antenna ports, if transform precoder is enabled and ULFPTxModes=Mode1, or if transform precoder is disabled, maxRank=1, and ULFPTxModes=Mode1

Table 7.3.1.1.2-4: Precoding information and number of layers, for 2 antenna ports, if transform precoder is disabled and maxRank=2

Table 7.3.1.1.2-4A: Precoding information and number of layers, for 2 antenna ports, if transform precoder is disabled, maxRank=2, and ULFPTxModes-Mode1

Table 7.3.1.1.2-5: Precoding information and number of layers, for 2 antenna ports, if transform precoder is enabled, or if transform precoder is disabled and maxRank=1

Table 7.3.1.1.2-5A: Precoding information and number of layers, for 2 antenna ports, if transform precoder is enabled and ULFPTxModes=Mode1, or if transform precoder is disabled, maxRank=1, and ULFPTxModes=Mode1

In each table, the UE selects one column with regard to higher layer parameter codebookSubset, which may be configured with 'fully AndPartialAndNonCoherent', or 'partial AndNonCoherent', or 'nonCoherent' depending on the UE capability.

The DCI field of Precoding information and number of layers indicates TPMI and TRI for PUSCH transmission. The size of the DCI field for TPMI and TRI is determined by the selected state.

- 0 bits if the higher layer parameter txConfig=nonCodeBook;
- 0 bits for 1 antenna port and if the higher layer parameter txConfig=codebook;
- 4, 5, or 6 bits according to Table 7.3.1.1.2-2 for 4 antenna ports, if txConfig=codebook, ULFPTxModes is either not configured or configured to Mode2, and according to whether transform precoder is enabled or disabled, and the values of higher layer parameters maxRank, and codebookSubset;
- 4 or 5 bits according to Table 7.3.1.1.2-2A for 4 antenna ports, if txConfig=codebook, ULFPTxModes=Mode1, maxRank=2, transform precoder is disabled, and according to the values of higher layer parameter codebookSubset;
- 4 or 6 bits according to Table 7.3.1.1.2-2B for 4 antenna ports, if txConfig=codebook, ULFPTxModes=Mode1, maxRank=3 or 4, transform precoder is disabled, and according to the values of higher layer parameter codebookSubset;
- 2, 4, or 5 bits according to Table 7.3.1.1.2-3 for 4 antenna ports, if txConfig=codebook, ULFPTxModes is either not configured or configured to Mode2, and according to whether transform precoder is enabled or disabled, and the values of higher layer parameters maxRank, and codebookSubset;
- 3 or 4 bits according to Table 7.3.1.1.2-3A for 4 antenna ports, if txConfig=codebook, ULFPTxModes=Mode 1, maxRank=1, and according to whether transform precoder is enabled or disabled, and the values of higher layer parameter codebookSubset;
- 2 or 4 bits according to Table7.3.1.1.2-4 for 2 antenna ports, if txConfig=codebook, ULFPTxModes is either not configured or configured to Mode2, and according to whether transform precoder is enabled or disabled, and the values of higher layer parameters maxRank and codebookSubset;
- 2 bits according to Table 7.3.1.1.2-4A for 2 antenna ports, if txConfig=codebook, ULFPTxModes=Mode1, transform precoder is disabled, maxRank=2, and codebookSubset=nonCoherent;
- 1 or 3 bits according to Table7.3.1.1.2-5 for 2 antenna ports, if txConfig=codebook, ULFPTxModes is either not configured or configured to Mode2, and according to whether transform precoder is enabled or disabled, and the values of higher layer parameters maxRank and codebookSubset;
- 2 bits according to Table 7.3.1.1.2-5A for 2 antenna ports, if txConfig=codebook, ULFPTxModes=Mode 1, maxRank=1, and according to whether transform precoder is enabled or disabled, and the values of higher layer parameter codebookSubset.

There currently exist certain challenges. For example, the DFT-S-OFDM waveform has lower PAPR than CP-OFDM, but it is limited to a single layer transmission in NR. Thus, uplink transmission with multiple layer transmission is not possible unless CP-OFDM is used for PUSCH.

Discontiguous frequency domain transmission increases DFT-S-OFDM PAPR and CM, and so is not supported for NR. Therefore, it is not feasible to transmit PUSCH in different subbands to obtain greater frequency domain diversity or to better match frequency selective fading in a channel.

SUMMARY

Based on the description above, certain challenges currently exist with new radio (NR) multiple layer and subband transmission. Certain aspects of the present disclosure and their embodiments may provide solutions to these or other challenges. For example, particular embodiments support codebook-based uplink multiple-input multiple-output (MIMO) for multiple-layer (two layers or more) with discrete Fourier transform (DFT) spread orthogonal frequency division multiplexing (OFDM) (also referred to as DFT-S-OFDM) enabled. Some embodiments include precoding matrices that do not increase peak to average power ration (PAPR) or cubic metric (CM) for DFT-S-OFDM transmission for 2 antenna ports and 4 antenna ports. The precoding matrices are for non-coherent user equipment (UE) and partially coherent UE. According to some embodiments, transmitted precoding matrix indicator (TPMI) and transmission rank indicator (TRI) can be jointly encoded as new tables or new entries to existing tables, or TPMI/TRI can be separately encoded as new downlink control information (DCI) fields.

Some embodiments improve the physical uplink shared channel (PUSCH) performance using discontiguous multi-subband DFT-S-OFDM transmission using multiple UE antennas. Particular embodiments map the transmissions to antenna ports and/or spatial layers and allocate frequency domain resources efficiently.

In general, particular embodiments support multiple-layer uplink MIMO with DFT-S-OFDM with precoding matrices and the precoders' mapping to UE coherency capability and DCI signaling of TPMI/TRI. The network selects TPMI from a new precoding matrix table according to TRI and UE coherency capability and indicates TPMI/TRI with DCI signaling.

In a first example embodiment, DFT-S-OFDM transmission for greater than rank 1 can have non-coherent and partially coherent precoders. It includes a method for transmitting multiple layers of a physical channel in a UE, wherein a subset of a codebook for use when transform precoding of a physical channel is disabled is used for greater than one layer transmission when transform precoding is enabled.

In a first mode of operation, the subset comprises precoding matrices with at most one non-zero element per column. In a second mode of operation, the subset comprises precoding matrices with at most two non-zero elements per column.

The UE indicates capability for one of the first and second modes of operation. The UE is configured for a selected mode, the selected mode being one of at least the first and second mode, and transmits the physical channel using the subset comprising the matrices according to the selected mode.

A second example embodiment additionally supports rank one DFT-S-OFDM transmission with fully coherent precoders. The subset further comprises precoding matrices with more than two non-zero elements for use with single layer transmission, the UE indicates capability for a third mode of operation, and the selected mode is the third mode.

In a third example embodiment, the UE transmits MIMO layers using contiguous subbands, where the subbands can be anywhere in the bandwidth part. A method of multi-antenna transmission in a UE comprises receiving signaling identifying a first and a second subband. The subbands contain contiguous frequency domain resources and at least a portion of the frequency domain resources of one of the subbands is not contained within the other subband. The method further comprises encoding and mapping a set of information bits to the first and the second subband, thereby forming one or more spatial layers according to a mapping of a plurality of antenna ports to the one or more spatial layers. The method further comprises transmitting the one or more spatial layers in the subbands and within a same OFDM symbol.

A fourth example embodiment uses DFT-S-OFDM. The embodiment includes the method of the second embodiment, wherein the step of mapping the first and the second set layer further comprises transform precoding the layers.

In a fourth example embodiment, the first subband location is signaled, and the second is determined using a known offset. The embodiment includes the method of the third or fourth embodiments, further comprising receiving an allocation of frequency domain resources for the first subband that indicate a starting PRB index and a number of contiguous PRBs and determining frequency domain resources for the second subband by adding an integer offset to the starting PRB index.

In a fifth example embodiment, subbands are one-to-one mapped to antenna ports. The embodiment includes the method of any of the third to fifth embodiments, wherein the first and the second subband are each associated with a first set and a second set of antenna ports, respectively.

In a sixth example embodiment, subbands are one-to-one mapped to layers. The embodiment includes the method of any of the third to fifth embodiments, wherein the first and the second subbands are each associated with a spatial multiplexing layer.

In a seventh example embodiment, a precoder is used to map ports to subbands. The embodiment includes the method of any of the third to fifth embodiments, wherein the UE uses a precoder for transmission on a subband of the first and second subband, comprising that when the precoder contains a non-zero element corresponding to a first or a second antenna port, the UE transmits with non-zero power on the subband of the first and second subband.

In an eighth example embodiment, occupied subbands are signaled and a fixed antenna port to subband mapping is used. The embodiment includes the method of any of the third to seventh embodiments, wherein the UE receives an indication comprising one of if the UE is to transmit on the first subband and if the UE is to transmit on both the first and second subbands and the UE transmits the one or more spatial layers in the first and the second subband, respectively, according to an antenna port associated with the first and second subband, respectively.

According to some embodiments, a method performed by a wireless device for transmitting multiple layers of a physical channel using a DFT-S-OFDM uplink waveform comprises transmitting to a network node an indication of a capability of the wireless device to operate according to a first mode of operation and a second mode of operation. In the first mode of operation a codebook subset comprises precoding matrices with at most one non-zero elements per column, and in the second mode of operation the codebook subset comprises precoding matrices with at most two non-zero elements per column. The codebook subset is in a codebook that is designated for use when transform precoding of a physical channel is disabled. The method further comprises receiving a configuration from the network node for a selected mode of the first mode of operation and the second mode of operation and transmitting the physical channel using transform precoding and, at least when transmitting with two layers, using the codebook subset comprising the precoding matrices of the selected mode.

In particular embodiments, the first mode of operation is associated with a non-coherent codebook and the second mode of operation is associated with one of a non-coherent codebook and a partially-coherent codebook.

In particular embodiments, for a third mode of operation the codebook subset further comprises precoding matrices with more than two non-zero elements for use with single layer transmission. The indication transmitted to the network node indicates capability for the third mode of operation, the selected mode is the third mode, and transmitting the physical channel comprises transmitting the physical channel with one layer.

According to some embodiments, a method performed by a wireless device for multiple antenna transmission using a DFT-S-OFDM uplink waveform comprises receiving signaling identifying a first and a second subband. The subbands contain contiguous frequency domain resources, and at least a portion of the frequency domain resources of one of the subbands is not contained within the other subband. The method further comprises encoding and mapping a set of information bits to the first and the second subband, thereby forming one or more spatial layers according to a mapping of a plurality of antenna ports to the one or more spatial layers and transmitting the one or more spatial layers in the subbands and within a same OFDM symbol.

In particular embodiments, mapping the set of information bits to the first and the second subband comprises transform precoding the one or more spatial layers.

In particular embodiments, the method further comprises receiving an allocation of frequency domain resources for the first subband that indicate a starting physical resource block (PRB) index and a number of contiguous PRBs and determining frequency domain resources for the second subband by adding an integer offset to the starting PRB index.

In particular embodiments, the first subband is associated with a first set of antenna ports and the second subband is associated with a second set of antenna ports.

In particular embodiments, the first subband is associated with a first spatial layer and the second subband is associated with a second spatial layer.

In particular embodiments, the wireless device uses a precoder for transmission on a subband of the first and second subband. When the precoder contains a non-zero element corresponding to a first or a second antenna port, the wireless device transmits with non-zero power on the subband of the first and second subband.

In particular embodiments, the wireless device receives one of a first and a second indication conveying one of if the wireless device is to transmit on the first subband and if the wireless device is to transmit on both the first and second subbands, respectively. Upon receiving the first indication, the wireless device transmits a first spatial layer according to a first antenna port associated with the first subband. Upon receiving the second indication, the wireless device transmits two spatial layers in the first and the second subband, respectively, according to the first antenna port associated with the first subband and a second antenna port associated with the second subband, respectively.

According to some embodiments, a wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

According to some embodiments, a method performed by a network node for receiving multiple layers of a physical channel using a DFT-S-OFDM uplink waveform comprises receiving from a wireless device an indication of a capability of the wireless device to operate according to a first mode of operation and a second mode of operation. In the first mode of operation a codebook subset comprises precoding matrices with at most one non-zero elements per column, and in the second mode of operation the codebook subset comprises precoding matrices with at most two non-zero elements per column. The codebook subset is in a codebook that can be configured when transform precoding of a physical channel is disabled. The method further comprises transmitting a configuration to the wireless device for a selected mode of the first mode of operation and the second mode of operation and at least when receiving two layers, receiving the physical channel according to the use of transform precoding and the codebook subset comprising the matrices of the selected mode.

According to some embodiments, a method performed by a network node for receiving a multiple antenna transmission using a DFT-S-OFDM uplink waveform comprises transmitting signaling to a wireless device. The signaling identifies a first and a second subband, wherein the subbands contain contiguous frequency domain resources, and at least a portion of the frequency domain resources of one of the subbands is not contained within the other subband. The method further comprises receiving, from the wireless device, a set of encoded information bits mapped to the first and second subband and within a same OFDM symbol according to a mapping of a plurality of antenna ports in the wireless device to one or more spatial layers.

In particular embodiments, the method further comprises transmitting to the wireless device an allocation of frequency domain resources for the first subband that indicate a starting PRB index and a number of contiguous PRBs, wherein the frequency domain resources for the second subband are offset from the starting PRB index by an integer offset.

According to some embodiments, a network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments provide improved coverage of normal PUSCH transmissions from UEs in RRC connected mode. The improved coverage is a result of precoding matrices for multiple-layer uplink MIMO when DFT-S-OFDM based waveform is used, which can increase network spectrum efficiency. By limiting to precoders used for non-coherent UE and partially coherent transmission, UE PAPR or CM of multiple layer uplink MIMO of proposed precoders is no higher than 1-layer uplink MIMO transmission by coherent UE.

Particular embodiments support multi-subband discontiguous DFT-S-OFDM transmission, which can improve frequency domain diversity and/or better adapt to frequency selective fading. Because multiple antennas are used such that each transmit chain only carries one subband, the higher PAPR or CM normally associated with frequency selective transmission for DFT-S-OFDM is avoided. Some embodiments include low signaling overhead mechanisms for resource allocation for the discontiguous subbands.

BRIEF DESCRIPTION OF THE DRAWINGS

For a more complete understanding of the disclosed embodiments and their features and advantages, reference is now made to the following description, taken in conjunction with the accompanying drawings, in which:

FIGS. 10A and 10B are flowcharts illustrating example methods in a wireless device, according to certain embodiments;

DETAILED DESCRIPTION

Figure 1:
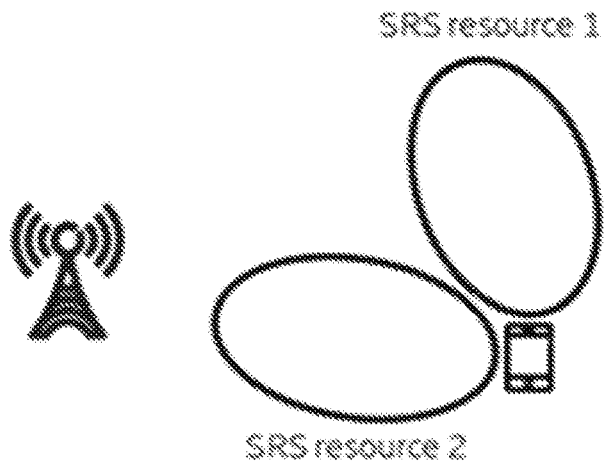
FIG. 1 illustrates the process of codebook-based uplink MIMO in three steps.
Figure 1:
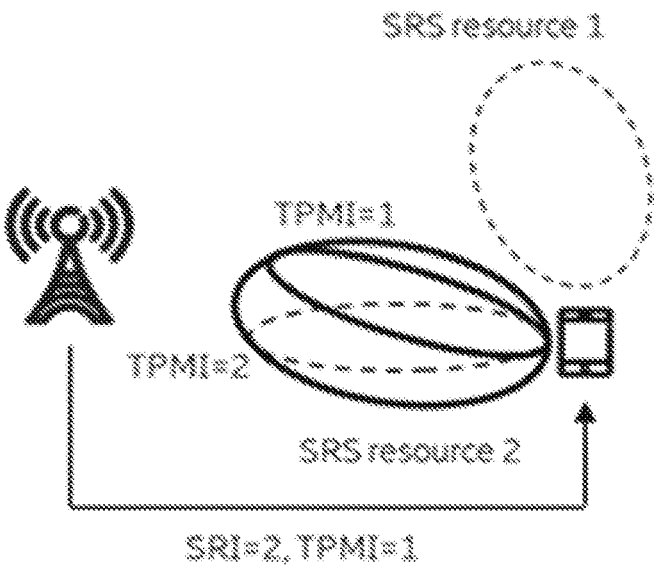
Figure 1:
Figure 2:
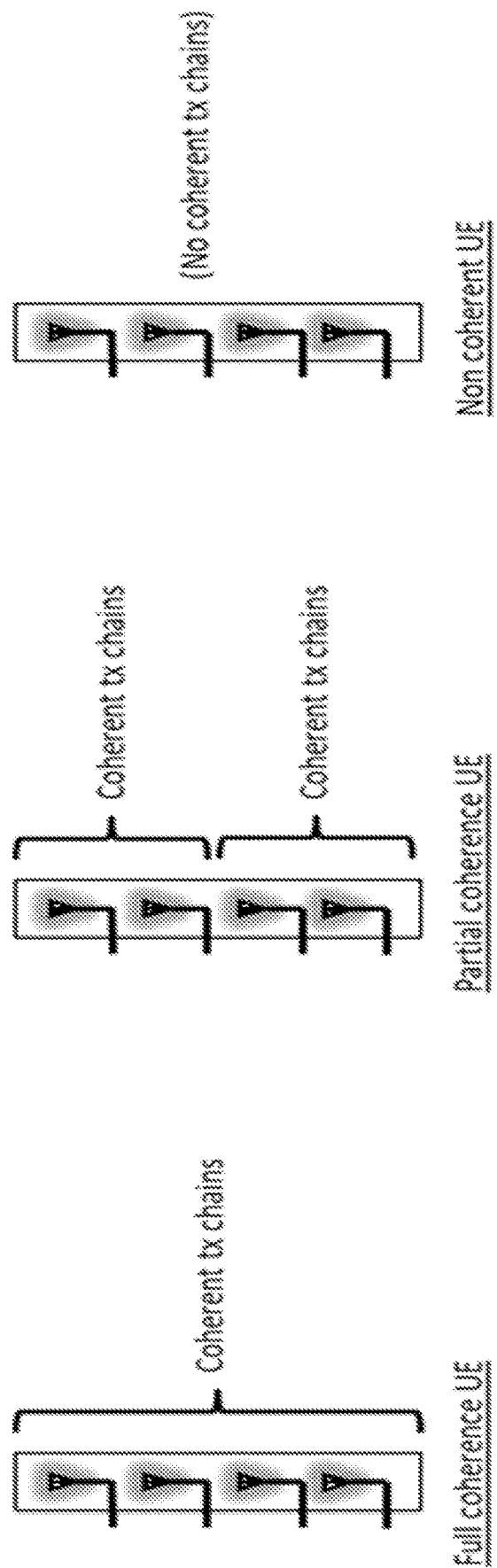
FIG. 2 illustrates UE coherency capabilities.
Figure 3:
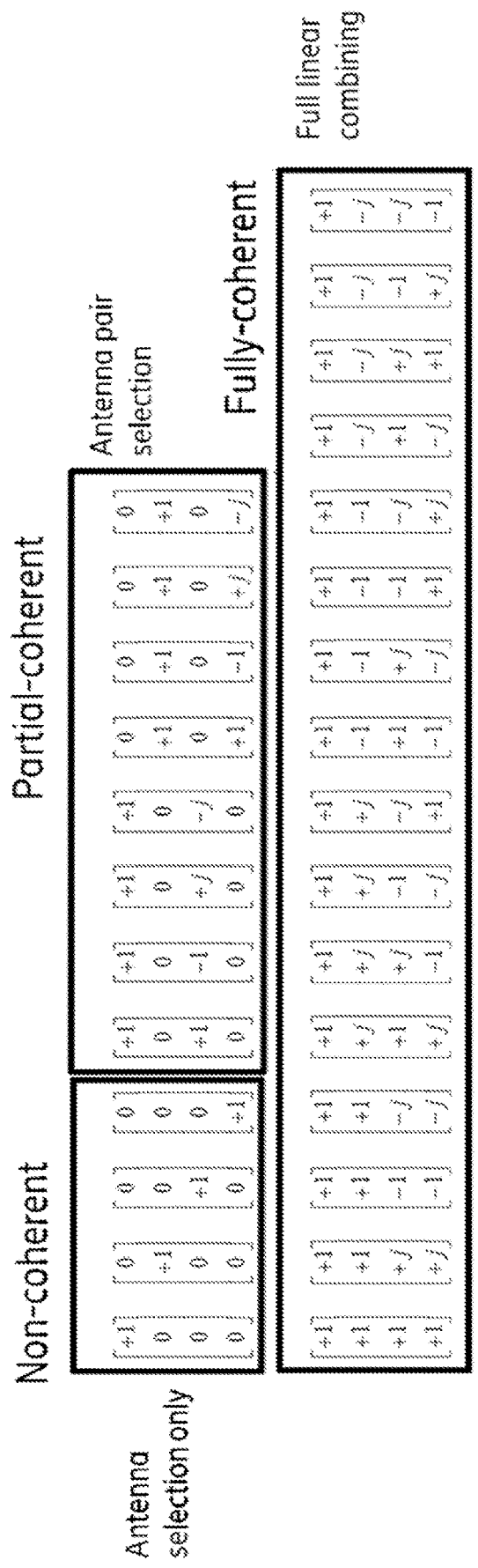
FIG. 3 illustrates the different subset codebook for rank 1 precoders.

Based on the description above, certain challenges currently exist with new radio (NR) multiple layer and subband transmission. Certain aspects of the present disclosure and their embodiments may provide solutions to these or other challenges. For example, particular embodiments support codebook-based uplink multiple-input multiple-output (MIMO) for multiple-layer (two layers or more) with discrete Fourier transform (DFT) spread orthogonal frequency division multiplexing (OFDM) (also referred to as DFT-S-OFDM) enabled.

Some embodiments include precoding matrices that do not increase peak to average power ration (PAPR) or cubic metric (CM) for DFT-S-OFDM transmission for 2 antenna ports and 4 antenna ports. The precoding matrices are for non-coherent user equipment (UE) and partially coherent UE. According to some embodiments, transmitted precoding matrix indicator (TPMI) and transmission rank indicator (TRI) can be jointly encoded as new tables or new entries to existing tables, or TPMI/TRI can be separately encoded as new downlink control information (DCI) fields.

Some embodiments improve the physical uplink shared channel (PUSCH) performance using discontiguous multi-subband DFT-S-OFDM transmission using multiple UE antennas. Particular embodiments map the transmissions to antenna ports and/or spatial layers and allocate frequency domain resources efficiently.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Particular embodiments improve multi-layer PUSCH transmission using DFT-S-OFDM in NR when UEs are in RRC connected mode. Particular examples include multiple layer transmission with 2 or 4 antenna ports in UEs with non-coherent and partially coherent uplink MIMO transmission capabilities. When more than one layer is transmitted, fully coherent precoders map one layer to multiple antenna ports and cause higher PAPR and/or higher CM in multiple layer transmission than in single layer transmission, which undermines the advantages of DFT-S-OFDM. This can be observed by comparing the example precoders for full, partial, and non-coherent 4 port rank two transmission below.

| TPMI14 (fully coherent): | TPMI6 (partially coherent): | TPMI0 (non-coherent): |
|---|---|---|
| $\frac{1}{2\sqrt{2}}\begin{bmatrix} 1 & 1 \\ 1 & 1 \\ 1 & -1 \\ 1 & -1 \end{bmatrix}$ | $\frac{1}{2}\begin{bmatrix} 1 & 0 \\ 0 & 1 \\ 1 & 0 \\ 0 & -j \end{bmatrix}$ | $\frac{1}{2}\begin{bmatrix} 1 & 0 \\ 0 & 1 \\ 0 & 0 \\ 0 & 0 \end{bmatrix}$ |

In the above matrices, the rows correspond to antenna ports, and the columns correspond to layers. The fully coherent precoding matrix has two non-zero magnitude values in both columns, which means that two layers combine together on the antenna ports, increasing the combined signal magnitude by at most a factor of two, and therefore the signal power and so the PAPR and CM by a factor of at most 4. On the other hand, there is at most one non-zero magnitude values per row for both of the partially and non-coherent precoding matrices, which means that transmitting with these matrices will not increase PUSCH PAPR or CM.

The potential PAPR increase is even more severe for 4 antenna port operation. PAPR may increase by a factor of 16 (because signal magnitude can grow by at most 4 times).

Particular embodiments include precoding matrices for DFT-S-OFDM. The precoding matrices for multiple layer DFT-S-OFDM transmission are described in Table 5.1-1, Table 5.1-2 and Table 5.1-3.

The tables are constructed by starting with the precoders used in NR for more than one layer when transform precoding is disabled, that is, when CP-OFDM is used so DFT-S-OFDM is not, which comprises Tables 6.3.1.5-4, 6.3.1.5-5, 6.3.1.5-6, and 6.3.1.5-7 from 3GPP TS 38.211 rev. 16.2.0. Next, the TPMIs that require full coherence are excluded; such TPMIs are those that have more than one non-zero values in any row of the precoding matrix. This results in Tables 5.1-1, 5.1-2, and 5.1-3 below. The tables contain the TPMIs used by NR UEs capable of partially coherent operation. Therefore, it is not necessary to list them in separate tables from Tables 6.3.1.5-4, 6.3.1.5-5, and 6.3.1.5-6 in 3GPP TS 38.211 rev. 16.2.0.

For rank 4 transmission, NR Rel-15 partially coherent UEs support TPMIs 1 and 2 below Table 6.3.1.5-7 in 3GPP TS 38.211 rev. 16.2.0, which will increase PAPR because two layers combine on each antenna port. Therefore, rank 4 transmission in the embodiment according to Table 5.1-4 below supports only the Rel-15 TPMI0, which is supported by non-coherent UEs.

$$TPMI1: \frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$$

$$TPMI2: \frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$$

Because full or partial coherent transmission does not increase PAPR or CM when single layer NR precoders when transform precoding is disabled (such as those in Tables 6.3.1.5-1 or 6.3.1.5-3 in 3GPP TS 38.211) are used, it is possible to use these precoders for rank 1 transmission for DFT-S-OFDM. Indeed, this is done for NR, because Table 6.3.1.5-1 in 38.211 is used for rank 1 two port transmission for both cases when transform precoding is and is not enabled.

However, four port transmission has a different rank 1 codebook when transform precoding is used than when it is disabled. It may be desirable to maintain backward compatibility for the rank 1 case. Therefore, in one aspect of this embodiment, the UE uses Rel-15 precoders for rank 1 transmission when transform precoding is enabled for rank 1 transmission of PUSCH when the UE is configured such that it can transmit PUSCH with transform precoding for ranks greater than rank 1. In an alternative aspect of this embodiment, for example where backward compatibility is less important, the UE uses the Rel-15 precoders for rank 1 transmission when transform precoding is disabled for rank 1 transmission of PUSCH when the UE is configured such that it can transmit PUSCH with transform precoding for ranks greater than rank 1.

Regardless of whether a standard specification lists the precoding matrices used for transform precoding with greater than rank 1 separately from those used for when transform precoding is disabled, the precoding matrices can be the same for when transform precoding is or is not used.

Therefore, a general expression of this embodiment is as follows: A subset of a codebook for use when transform precoding of a physical channel is disabled is used for greater than one layer transmission when transform precoding is enabled. In a first mode of operation, the subset comprises precoding matrices with at most one non-zero element per column. In a second mode of operation, the subset comprises precoding matrices with at most two non-zero elements per column. The UE indicates capability for one of the first and second modes of operation. The UE is configured for a selected mode, the selected mode being one of at least the first and second mode, and transmits the physical channel using the subset comprising the matrices according to the selected mode. In some embodiments, a UE that supports the first mode indicates support for a non-coherent codebook subset and a UE that supports the second mode indicates support for a partial and non-coherent codebook subset. In some embodiments, the subset may be selected according to both a precoding and number of layers indication and whether transform precoding is used.

Because multiple layers cannot combine on a port when only one layer is transmitted, the precoders that can be used for one layer transmission can be less restricted than for transmissions with more than one layer. Therefore, the general expression of the embodiment above may be further extended to support single layer transmission. The subset further comprises precoding matrices with more than two non-zero elements for use with single layer transmission, the UE indicates capability for a third mode of operation, and the selected mode is the third mode.

For 2 antenna ports with DFT-S-OFDM operation, the 2 ports can only be non-coherent, and a single PMI is supported for rank 2, as can be seen in Table 5.1-1.

For a 4 antenna port UE, two-, three-, and four-layer transmission are supported. In the 4-layer case, TPMIs 1 and 2 of Table 6.3.1.5-7 from 3GPP TS 38.211 rev 16.2.0 can be used for partial coherent operation in NR. However, these two precoding matrices both have two non-zero magnitude values per row, and so may increase PAPR and CM. Therefore, these two TPMIs are not used for rank 4 for DFT-S-OFDM transmission, and only the noncoherent TPMI (TPMI 0 from Table 6.3.1.5-7) is included in the embodiment. Therefore, a UE that supports partially coherent operation will support only TPMI0 for rank4 operation with DFT-S-OFDM.

TABLE 5.1-1

Precoding matrix W for two-layer transmission using two antenna ports with transform precoding enabled.

| TPMI index | W (ordered from left to right in increasing order of TPMI index) |
|---|---|
| 0 | $\frac{1}{\sqrt{2}}\begin{bmatrix} 1 & 0 \\ 0 & 1 \end{bmatrix}$ |

TABLE 5.1-2

Precoding matrix W for two-layer transmission using four antenna ports with transform precoding enabled.

| TPMI index | W (ordered from left to right in increasing order of TPMI index) | | | |
|---|---|---|---|---|
| 0-3 | $\frac{1}{2}\begin{bmatrix}1&0\\0&1\\0&0\\0&0\end{bmatrix}$ | $\frac{1}{2}\begin{bmatrix}1&0\\0&0\\0&1\\0&0\end{bmatrix}$ | $\frac{1}{2}\begin{bmatrix}1&0\\0&0\\0&0\\0&1\end{bmatrix}$ | $\frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}$ | $\frac{1}{2}\begin{bmatrix}0&0\\0&0\\1&0\\0&1\end{bmatrix}$ | $\frac{1}{2}\begin{bmatrix}1&0\\0&1\\1&0\\0&-j\end{bmatrix}$ | $\frac{1}{2}\begin{bmatrix}1&0\\0&1\\1&0\\0&j\end{bmatrix}$ |
| 8-11 | $\frac{1}{2}\begin{bmatrix}1&0\\0&1\\-j&0\\0&1\end{bmatrix}$ | $\frac{1}{2}\begin{bmatrix}1&0\\0&1\\-j&0\\0&-1\end{bmatrix}$ | $\frac{1}{2}\begin{bmatrix}1&0\\0&1\\-1&0\\0&-j\end{bmatrix}$ | $\frac{1}{2}\begin{bmatrix}1&0\\0&1\\-1&0\\0&j\end{bmatrix}$ |
| 12-13 | $\frac{1}{2}\begin{bmatrix}1&0\\0&1\\j&0\\0&1\end{bmatrix}$ | $\frac{1}{2}\begin{bmatrix}1&0\\0&1\\j&0\\0&-1\end{bmatrix}$ | | |

TABLE 5.1-3

Precoding matrix W for three-layer transmission using four antenna ports with transform precoding enabled.

| TPMI index | W (ordered from left to right in increasing order of TPMI index) | | |
|---|---|---|---|
| 0-2 | $\frac{1}{2}\begin{bmatrix}1&0&0\\0&1&0\\0&0&1\\0&0&0\end{bmatrix}$ | $\frac{1}{2}\begin{bmatrix}1&0&0\\0&1&0\\1&0&0\\0&0&1\end{bmatrix}$ | $\frac{1}{2}\begin{bmatrix}1&0&0\\0&1&0\\-1&0&0\\0&0&1\end{bmatrix}$ |

TABLE 5.1-4

Precoding matrix W for four-layer transmission using four antenna ports with transform precoding enabled.

| TPMI index | W (ordered from left to right in increasing order of TPMI index) |
|---|---|
| 0 | $\frac{1}{2}\begin{bmatrix}1&0&0&0\\0&1&0&0\\0&0&1&0\\0&0&0&1\end{bmatrix}$ |

TABLE 5.1-2A

Precoding matrix W for two-layer transmission using four antenna ports with transform precoding enabled with additional precoders.

| TPMI index | W (ordered from left to right in increasing order of TPMI index) | | | |
|---|---|---|---|---|
| 0-3 | $\frac{1}{2}\begin{bmatrix}1&0\\0&1\\0&0\\0&0\end{bmatrix}$ | $\frac{1}{2}\begin{bmatrix}1&0\\0&0\\0&1\\0&0\end{bmatrix}$ | $\frac{1}{2}\begin{bmatrix}1&0\\0&0\\0&0\\0&1\end{bmatrix}$ | $\frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}$ | $\frac{1}{2}\begin{bmatrix}0&0\\1&0\\0&0\\0&1\end{bmatrix}$ | $\frac{1}{2}\begin{bmatrix}1&0\\0&1\\1&0\\0&-j\end{bmatrix}$ | $\frac{1}{2}\begin{bmatrix}1&0\\0&1\\1&0\\0&j\end{bmatrix}$ |
| 8-11 | $\frac{1}{2}\begin{bmatrix}1&0\\0&1\\-j&0\\0&1\end{bmatrix}$ | $\frac{1}{2}\begin{bmatrix}1&0\\0&1\\-j&0\\0&-1\end{bmatrix}$ | $\frac{1}{2}\begin{bmatrix}1&0\\0&1\\-1&0\\0&-j\end{bmatrix}$ | $\frac{1}{2}\begin{bmatrix}1&0\\0&1\\-1&0\\0&j\end{bmatrix}$ |
| 12-15 | $\frac{1}{2}\begin{bmatrix}1&0\\0&1\\j&0\\0&1\end{bmatrix}$ | $\frac{1}{2}\begin{bmatrix}1&0\\0&1\\j&0\\0&-1\end{bmatrix}$ | $\frac{1}{2}\begin{bmatrix}1&0\\0&1\\1&0\\0&1\end{bmatrix}$ | $\frac{1}{2}\begin{bmatrix}1&0\\0&1\\1&0\\0&-1\end{bmatrix}$ |
| 16-19 | $\frac{1}{2}\begin{bmatrix}1&0\\0&1\\-1&0\\0&1\end{bmatrix}$ | $\frac{1}{2}\begin{bmatrix}1&0\\0&1\\-1&0\\0&-1\end{bmatrix}$ | $\frac{1}{2}\begin{bmatrix}1&0\\0&1\\j&0\\0&j\end{bmatrix}$ | $\frac{1}{2}\begin{bmatrix}1&0\\0&1\\j&0\\0&-j\end{bmatrix}$ |
| 20-21 | $\frac{1}{2}\begin{bmatrix}1&0\\0&1\\-j&0\\0&j\end{bmatrix}$ | $\frac{1}{2}\begin{bmatrix}1&0\\0&1\\-j&0\\0&-j\end{bmatrix}$ | | |

TABLE 5.1-3A

Precoding matrix W for three-layer transmission using four antenna ports with transform precoding enabled with additional precoders.

| TPMI index | W (ordered from left to right in increasing order of TPMI index) | | | |
|---|---|---|---|---|
| 0-3 | $\frac{1}{2}\begin{bmatrix}1&0&0\\0&1&0\\0&0&1\\0&0&0\end{bmatrix}$ | $\frac{1}{2}\begin{bmatrix}1&0&0\\0&1&0\\1&0&0\\0&0&0\end{bmatrix}$ | $\frac{1}{2}\begin{bmatrix}1&0&0\\0&1&0\\-1&0&0\\0&0&1\end{bmatrix}$ | $\frac{1}{2}\begin{bmatrix}1&0&0\\0&1&0\\j&0&0\\0&0&1\end{bmatrix}$ |
| 4 | $\frac{1}{2}\begin{bmatrix}1&0&0\\0&1&0\\-j&0&0\\0&0&1\end{bmatrix}$ | | | |

Larger size codebooks may improve performance by allowing more precoders and thereby improving the chance to better match the channel fading conditions. Therefore, some embodiments use one or both of Tables 5.1-2A and 5.1-3A below in place of Tables 5.1-2 and 5.1-3 above, respectively.

Some embodiments include mapping between precoding matrix and UE coherency capability. In particular embodiments, the precoding matrices described above are mapped to UE maximum coherency capability. The precoding matrices listed in the tables below are the same as those described above.

| # Precoders | Number of layers v = 2 | Maximum Coherency Capability |
|---|---|---|
|  | — | Partially coherent |
| 1 | $\frac{1}{\sqrt{2}}\begin{bmatrix} 1 & 0 \\ 0 & 1 \end{bmatrix}$ | Non-coherent |

| # Precoders | Number of layers v = 2 | Maximum Coherency Capability |
|---|---|---|
| 8 | $\frac{1}{2}\begin{bmatrix} 1 & 0 \\ 0 & 1 \\ 1 & 0 \\ 0 & -j \end{bmatrix}$ $\frac{1}{2}\begin{bmatrix} 1 & 0 \\ 0 & 1 \\ 1 & 0 \\ 0 & j \end{bmatrix}$ $\frac{1}{2}\begin{bmatrix} 1 & 0 \\ 0 & 1 \\ -j & 0 \\ 0 & 1 \end{bmatrix}$ $\frac{1}{2}\begin{bmatrix} 1 & 0 \\ 0 & 1 \\ -j & 0 \\ 0 & -1 \end{bmatrix}$ $\frac{1}{2}\begin{bmatrix} 1 & 0 \\ 0 & 1 \\ -1 & 0 \\ 0 & -j \end{bmatrix}$ $\frac{1}{2}\begin{bmatrix} 1 & 0 \\ 0 & 1 \\ -1 & 0 \\ 0 & j \end{bmatrix}$ $\frac{1}{2}\begin{bmatrix} 1 & 0 \\ 0 & 1 \\ j & 0 \\ 0 & 1 \end{bmatrix}$ $\frac{1}{2}\begin{bmatrix} 1 & 0 \\ 0 & 1 \\ j & 0 \\ 0 & -1 \end{bmatrix}$ | Partially coherent with Rel-15 precoders |
| 16 | $\frac{1}{2}\begin{bmatrix} 1 & 0 \\ 0 & 1 \\ 1 & 0 \\ 0 & -j \end{bmatrix}$ $\frac{1}{2}\begin{bmatrix} 1 & 0 \\ 0 & 1 \\ 1 & 0 \\ 0 & j \end{bmatrix}$ $\frac{1}{2}\begin{bmatrix} 1 & 0 \\ 0 & 1 \\ -j & 0 \\ 0 & 1 \end{bmatrix}$ $\frac{1}{2}\begin{bmatrix} 1 & 0 \\ 0 & 1 \\ -j & 0 \\ 0 & -1 \end{bmatrix}$ $\frac{1}{2}\begin{bmatrix} 1 & 0 \\ 0 & 1 \\ -1 & 0 \\ 0 & -j \end{bmatrix}$ $\frac{1}{2}\begin{bmatrix} 1 & 0 \\ 0 & 1 \\ -1 & 0 \\ 0 & j \end{bmatrix}$ $\frac{1}{2}\begin{bmatrix} 1 & 0 \\ 0 & 1 \\ j & 0 \\ 0 & 1 \end{bmatrix}$ $\frac{1}{2}\begin{bmatrix} 1 & 0 \\ 0 & 1 \\ j & 0 \\ 0 & -1 \end{bmatrix}$ $\frac{1}{2}\begin{bmatrix} 1 & 0 \\ 0 & 1 \\ 1 & 0 \\ 0 & 1 \end{bmatrix}$ $\frac{1}{2}\begin{bmatrix} 1 & 0 \\ 0 & 1 \\ 1 & 0 \\ 0 & -1 \end{bmatrix}$ $\frac{1}{2}\begin{bmatrix} 1 & 0 \\ 0 & 1 \\ -1 & 0 \\ 0 & 1 \end{bmatrix}$ $\frac{1}{2}\begin{bmatrix} 1 & 0 \\ 0 & 1 \\ -1 & 0 \\ 0 & -1 \end{bmatrix}$ $\frac{1}{2}\begin{bmatrix} 1 & 0 \\ 0 & 1 \\ j & 0 \\ 0 & j \end{bmatrix}$ $\frac{1}{2}\begin{bmatrix} 1 & 0 \\ 0 & 1 \\ j & 0 \\ 0 & -j \end{bmatrix}$ $\frac{1}{2}\begin{bmatrix} 1 & 0 \\ 0 & 1 \\ -j & 0 \\ 0 & j \end{bmatrix}$ $\frac{1}{2}\begin{bmatrix} 1 & 0 \\ 0 & 1 \\ -j & 0 \\ 0 & -j \end{bmatrix}$ | Partially coherent with enhanced precoders |
| 6 | $\frac{1}{2}\begin{bmatrix} 1 & 0 \\ 0 & 1 \\ 0 & 0 \\ 0 & 0 \end{bmatrix}$ $\frac{1}{2}\begin{bmatrix} 1 & 0 \\ 0 & 0 \\ 0 & 1 \\ 0 & 0 \end{bmatrix}$ $\frac{1}{2}\begin{bmatrix} 1 & 0 \\ 0 & 0 \\ 0 & 0 \\ 0 & 1 \end{bmatrix}$ $\frac{1}{2}\begin{bmatrix} 0 & 0 \\ 1 & 0 \\ 0 & 1 \\ 0 & 0 \end{bmatrix}$ $\frac{1}{2}\begin{bmatrix} 0 & 0 \\ 1 & 0 \\ 0 & 0 \\ 0 & 1 \end{bmatrix}$ $\frac{1}{2}\begin{bmatrix} 0 & 0 \\ 0 & 0 \\ 1 & 0 \\ 0 & 1 \end{bmatrix}$ | Non-coherent |

| # Precoders | Number of layers v = 3 | Maximum Coherency Capability |
|---|---|---|
| 2 | $\frac{1}{2}\begin{bmatrix} 1 & 0 & 0 \\ 0 & 1 & 0 \\ 1 & 0 & 0 \\ 0 & 0 & 1 \end{bmatrix}$ $\frac{1}{2}\begin{bmatrix} 1 & 0 & 0 \\ 0 & 1 & 0 \\ -1 & 0 & 0 \\ 0 & 0 & 1 \end{bmatrix}$ | Partially coherent Rel-15 precoders |
| 4 | $\frac{1}{2}\begin{bmatrix} 1 & 0 & 0 \\ 0 & 1 & 0 \\ 1 & 0 & 0 \\ 0 & 0 & 1 \end{bmatrix}$ $\frac{1}{2}\begin{bmatrix} 1 & 0 & 0 \\ 0 & 1 & 0 \\ -1 & 0 & 0 \\ 0 & 0 & 1 \end{bmatrix}$ $\frac{1}{2}\begin{bmatrix} 1 & 0 & 0 \\ 0 & 1 & 0 \\ j & 0 & 0 \\ 0 & 0 & 1 \end{bmatrix}$ $\frac{1}{2}\begin{bmatrix} 1 & 0 & 0 \\ 0 & 1 & 0 \\ -j & 0 & 0 \\ 0 & 0 & 1 \end{bmatrix}$ | Partially coherent using enhanced precoders |
| 1 | $\frac{1}{2}\begin{bmatrix} 1 & 0 & 0 \\ 0 & 1 & 0 \\ 0 & 0 & 1 \\ 0 & 0 & 0 \end{bmatrix}$ | Non-coherent |

| # Precoders | | Maximum Coherency Capability |
|---|---|---|
| Number of layers v = 4 | | |
| 1 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | Non-coherent |

Some embodiments include DCI signaling of TPMI and TRI. To support multiple-layer uplink MIMO transmission with DFT-S-OFDM enabled, TPMI and TRI can be jointly encoded (as is done in Rel-15) or not. If TPMI and TRI are not jointly encoded, they can use separate new fields. If TPMI and TRI are jointly encoded, either additional table(s) are used, or additional entries are added to Rel-15 tables.

In one embodiment, TPMI and TRI can be indicated in one or more of below options.

In Option 1, TPMI and TRI are indicated in DCI as separate new DCI fields for multiple-layer uplink MIMO transmission with DFT-S-OFDM enabled. TRI is 2-bit, indicating 2, 3, or 4 layers. TPMI's length depends on the number of precoders associated with a given TRI value, and/or the number of antenna ports and/or the UE's coherency capability. The new DCI fields do not apply to 1-layer uplink MIMO with DFT-S-OFDM enabled.

The table below shows the number of precoders according to TRI, the number of antenna ports and the UE's coherency capability. The number of precoders for embodiments using the Rel-15 precoders in Tables 5.1-1, 5.1-2, 5.1-3, and 5.1-4 and for the embodiments using the precoders in Tables 5.1-1, 5.1-2A, 5.1-3A, and 5.1-4 that contain the enhanced 2 and 3 layer precoders are shown.

TABLE 5.1.3-1

Number of precoders for multiple layer transmission with two or four antenna ports

| | Number of new precoders for DFT-S-OFDM | | |
|---|---|---|---|
| | 2 antenna ports | 4 antenna ports using Rel-15 precoders | 4 antenna ports using enhanced precoders |
| 2 layers | NC(1) | NC(6) PC(8) | NC(6) PC(16) |
| 3 layers | — | NC(1) PC(2) | NC(1) PC(4) |
| 4 layers | — | NC(1) PC(0) | NC(1) PC(0) |

NC, PC and FC stand for non-coherency, partial coherency and full coherency. If DFT-S-OFDM is enabled, TPMI field size varies as described below and is given for both where the codebooks contain the Rel-15 based precoders and the enhanced precoders.

0 bits for 2 antenna ports and if TRI indicates 2 UL layers for the Rel-15 and the enhanced precoders 3 bits for 4 antenna ports and if TRI indicates 2 UL layers and higher level parameter codebookSubset is configured as noncoherent for the Rel-15 and the enhanced precoders 4 bits for 4 antenna ports and if TRI indicates 2 UL layers and higher level parameter codebookSubset is configured as partialAndNonCoherent for the Rel-15 precoders 5 bits for 4 antenna ports and if TRI indicates 2 UL layers and higher level parameter codebookSubset is configured as partialAndNonCoherent for the enhanced precoders 0 bits for 4 antenna ports and if TRI indicates 3 UL layers and higher level parameter codebookSubset is configured as noncoherent for the Rel-15 and the enhanced precoders 2 bits for 4 antenna ports and if TRI indicates 3 UL layers and higher level parameter codebookSubset is configured as partialAndNonCoherent for the Rel-15 precoders 3 bits for 4 antenna ports and if TRI indicates 3 UL layers and higher level parameter codebookSubset is configured as partialAndNonCoherent for and the enhanced precoders 0 bits for 4 antenna ports and if TRI indicates 4 UL layers and higher level parameter codebookSubset is configured as noncoherent or as partialAndNonCoherent for the Rel-15 and the enhanced and the enhanced precoders 0-bit means TPMI is absent. This happens when there is only one precoder for particular cases, e.g., NC(1) in above table.

In Option 2, TPMI and TRI are indicated in DCI as separate new DCI fields for both single- and multiple-layer uplink MIMO transmission with DFT-S-OFDM enabled. TRI is 2-bit, indicating 1, 2, 3, or 4 layers. TPMI length depends on the number of precoders associated with a given value of TRI, and/or the number of antenna ports, and/or the UE's coherency capability. Rel-15 TPMI/TRI joint tables are not used if DFT-S-OFDM is enabled.

For multiple layer MIMO with DFT-S-OFDM, TPMI field sizes for TRI=2, 3, or 4 are the same as the previous embodiment. Additionally, for 1-layer MIMO with DFT-S-OFDM, the TPMI field size is as follows, depending on the number of Rel-15 precoders, which is captured in Table 5.1.3-2.

−1 bit for 2 antenna ports and if TRI indicates 1 UL layer and higher level parameter codebookSubset is configured as noncoherent 3 bits for 2 antenna ports and if TRI indicates 1 UL layer and higher level parameter codebookSubset is configured as fully AndPartial AndNonCoherent 2 bits for 4 antenna ports and if TRI indicates 1 UL layer and higher level parameter codebookSubset is configured as noncoherent 4 bits for 4 antenna ports and if TRI indicates 1 UL layer and higher level parameter codebookSubset is configured as partial AndNonCoherent 5 bits for 4 antenna ports and if TRI indicates 1 UL layer and higher level parameter codebookSubset is configured as fully AndPartial AndNonCoherent

TABLE 5.1.3-2

Number of Rel-15 precoders for single layer
transmission with two or four antenna ports

| | Number of Rel-15 precoders for DFT-S-OFDM | |
|---|---|---|
| | 2 antenna ports | 4 antenna ports |
| 1 layer | NC(2) FC(4) | NC(4) PC(8) FC(16) |

In Option 3, TPMI and TRI are jointly encoded in new tables, as illustrated in Table 5.1.3-3 for 2 antenna ports and Table 5.1.3-4 for 4 antenna ports. In this embodiment, the TPMIs for single layer transmission are determined separately from those used for more than one layer. The embodiment may optionally use the Rel-15 codebook for one layer transmission with transform precoding when UEs are configured for transform precoding and a maximum rank greater than 1 to maintain backward compatibility.

TABLE 5.1.3-3

Precoding information and number of layers, for 2 antenna ports,
if transform precoder is enabled and maxRank = 2

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | reserved |
| 4 | 1 layer: TPMI = 3 | | |
| 5 | 1 layer: TPMI = 4 | | |
| 6 | 1 layer: TPMI = 5 | | |
| 7 | reserved | | |

TABLE 5.1.3-4

Precoding information and number of layers, for 4 antenna ports,
if transform precoder is enabled and maxRank = 2 or 3 or 4

| Bit field mapped to index | codebookSubset = partialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| ... | ... | ... | ... |
| 3 | 1 layer: TPMI = 3 | 3 | 1 layer: TPMI = 3 |
| 4 | 2 layers: TPMI = 0 | 4 | 2 layers: TPMI = 0 |
| ... | ... | ... | ... |
| 9 | 2 layers: TPMI = 5 | 9 | 2 layers: TPMI = 5 |
| ... | ... | ... | ... |
| 10 | 3 layers: TPMI = 0 | 10 | 3 layers: TPMI = 0 |
| 11 | 4 layers: TPMI = 0 | 11 | 4 layers: TPMI = 0 |
| 12 | 1 layer: TPMI = 4 | 12-15 | reserved |
| ... | ... | | |
| 19 | 1 layer: TPMI = 11 | | |
| 20 | 2 layers: TPMI = 6 | | |
| ... | ... | | |
| 27 | 2 layers: TPMI = 13 | | |
| 28 | 3 layers: TPMI = 1 | | |
| 29 | 3 layers: TPMI = 2 | | |
| 30-31 | reserved | | |

If enhanced precoders in Table 5.1-2A and Table 5.1-3A are used, Table 5.1.3-4A is used in place of Table 5.1.3-4.

TABLE 5.1.3-4A

Precoding information and number of layers, for 4 antenna ports,
if transform precoder is enabled and maxRank = 2 or 3 or 4

| Bit field mapped to index | codebookSubset = partialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| ... | ... | ... | ... |
| 3 | 1 layer: TPMI = 3 | 3 | 1 layer: TPMI = 3 |
| 4 | 2 layers: TPMI = 0 | 4 | 2 layers: TPMI = 0 |
| ... | ... | ... | ... |
| 9 | 2 layers: TPMI = 5 | 9 | 2 layers: TPMI = 5 |
| 10 | 3 layers: TPMI = 0 | 10 | 3 layers: TPMI = 0 |
| 11 | 4 layers: TPMI = 0 | 11 | 4 layers: TPMI = 0 |
| 12 | 1 layer: TPMI = 4 | 12-15 | reserved |
| ... | ... | | |
| 19 | 1 layer: TPMI = 11 | | |
| 20 | 2 layers: TPMI = 6 | | |
| ... | ... | | |
| 35 | 2 layers: TPMI = 21 | | |
| 36 | 3 layers: TPMI = 1 | | |
| ... | ... | | |
| 39 | 3 layers: TPMI = 4 | | |
| 40-63 | reserved | | |

In Option 4, TPMI and TRI are jointly encoded and added as new Tables. Table 5.1.3-5 replaces Table 7.3.1.1.2-3 and Table 5.1.3-6 replaces 7.3.1.1.2-5 from 3GPP TS 38.212. In this embodiment, the TPMIs for single layer transmission are determined jointly with those used for more than one layer. The embodiment may optionally use the Rel-15 codebook for one layer transmission with transform precoding when UEs are configured for transform precoding and a maximum rank greater than 1 to maintain backward compatibility. Table titles are also updated.

TABLE 5.1.3-5

Precoding information and number of layers for 4 antenna ports, if transform precoder is
enabled and maxRank = 1, 2, 3, or 4, or if transform precoder is disabled and maxRank = 1

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| ... | ... | ... | ... | ... | ... |

TABLE 5.1.3-5-continued

Precoding information and number of layers for 4 antenna ports, if transform precoder is enabled and maxRank = 1, 2, 3, or 4, or if transform precoder is disabled and maxRank = 1

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | reserved |
| ... | ... | ... | ... | | |
| 19 | 1 layer: TPMI = 11 | 19 | 1 layer: TPMI = 11 | | |
| 20 | 2 layers: TPMI = 6 | 20 | 2 layers: TPMI = 6 | | |
| ... | ... | ... | ... | | |
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |
| 30 | 1 layer: TPMI = 12 | 30-31 | reserved | | |
| ... | ... | | | | |
| 45 | 1 layer: TPMI = 27 | | | | |
| 46-63 | reserved | | | | |

TABLE 5.1.3-6

Precoding information and number of layers, for 2 antenna ports, if transform precoder is enabled and maxRank = 1 or 2, or if transform precoder is disabled and maxRank = 1

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | reserved |
| 4 | 1 layer: TPMI = 3 | | |
| 5 | 1 layer: TPMI = 4 | | |
| 6 | 1 layer: TPMI = 5 | | |
| 7 | reserved | | |

5 Based on Table 5.1.3-5 and Table 5.1.3-6, bit length of Precoding information and number of layers is updated:
  4, 5, or 6 bits for 4 antenna ports, according to higher layer parameter codebookSubset,
  2 or 3 bits for 2 antenna ports, according to higher layer parameter codebookSubset
If enhanced precoders in Table 5.1-2A and Table 5.1-3A are used, Table 5.1.3-5A is used in place of Table 5.1.3-5.

TABLE 5.1.3-5A

Precoding information and number of layers for 4 antenna ports, if transform precoder is enabled and maxRank = 1 or 2 or 3 or 4, or if transform precoder is disabled and maxRank = 1

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| ... | ... | ... | ... | ... | ... |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | reserved |
| ... | ... | ... | ... | | |
| 19 | 1 layer: TPMI = 11 | 19 | 1 layer: TPMI = 11 | | |
| 20 | 2 layers: TPMI = 6 | 20 | 2 layers: TPMI = 6 | | |
| ... | ... | ... | ... | | |
| 35 | 2 layers: TPMI = 21 | 35 | 2 layers: TPMI = 21 | | |
| 36 | 3 layers: TPMI = 1 | 36 | 3 layers: TPMI = 1 | | |
| ... | ... | ... | ... | | |

TABLE 5.1.3-5A-continued

Precoding information and number of layers for 4 antenna ports, if transform precoder is enabled and maxRank = 1 or 2 or 3 or 4, or if transform precoder is disabled and maxRank = 1

| Bit field mapped to index codebookSubset = fullyAndPartialAndNonCoherent | | Bit field mapped to index codebookSubset = partialAndNonCoherent | | Bit field mapped to index codebookSubset = nonCoherent | |
|---|---|---|---|---|---|
| 39 | 3 layers: TPMI = 4 | 39 | 3 layers: TPMI = 4 | | |
| 40 | 1 layer: TPMI = 12 | 40-63 | reserved | | |
| ... | ... | | | | |
| 55 | 1 layer: TPMI = 27 | | | | |
| 56-63 | reserved | | | | |

Based on Table 5.1.3-5A, bit length of Precoding information and number of layers is updated:

4 or 6 bits for 4 antenna ports, according to higher layer parameter codebookSubset;

In Option 5, TPMI and TRI are jointly encoded. The corresponding table title is also updated to identify that transform precoding is supported for ranks 2 and 3. Table 7.3.1.1.2-4 in 38.212 rev. 16.2.0 can be reused with title changed from "Table 7.3.1.1.2-4: Precoding information and number of layers, for 2 antenna ports, if transform precoder is disabled and maxRank=2" to "Table 7.3.1.1.2-4: Precoding information and number of layers, for 2 antenna ports, if transform precoder is disabled or enabled and maxRank=2"

Table 7.3.1.1.2-2 in 38.212 can be reused with title changed from "Table 7.3.1.1.2-2: Precoding information and number of layers, for 4 antenna ports, if transform precoder is disabled and maxRank=2 or 3 or 4" to "Table 7.3.1.1.2-2: Precoding information and number of layers, for 4 antenna ports, if transform precoder is disabled or enabled and maxRank=2 or 3 or 4".

TABLE 5.1.3-7

Precoding information and number of layers, for 4 antenna ports, if transform precoder is disabled and maxRank = 2 or 3 or 4 or if transform precoder is enabled and maxRank = 2 or 3 or 4

| Bit field mapped to index codebookSubset = fullyAndPartialAndNonCoherent | | Bit field mapped to index codebookSubset = partialAndNonCoherent | | Bit field mapped to index codebookSubset = nonCoherent | |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| ... | ... | ... | ... | ... | ... |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | reserved |
| ... | ... | ... | ... | | |
| 19 | 1 layer: TPMI = 11 | 19 | 1 layer: TPMI = 11 | | |
| 20 | 2 layers: TPMI = 6 | 20 | 2 layers: TPMI = 6 | | |
| ... | ... | ... | ... | | |
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |
| 30 | 4 layers: TPMI = 1 | 30 | 4 layers: TPMI = 1 | | |
| 31 | 4 layers: TPMI = 2 | 31 | 4 layers: TPMI = 2 | | |
| 32 | 1 layer: TPMI = 12 | | | | |
| ... | ... | | | | |
| 47 | 1 layer: TPMI = 27 | | | | |
| 48 | 2 layers: TPMI = 14 | | | | |
| ... | ... | | | | |
| 55 | 2 layers: TPMI = 21 | | | | |
| 56 | 3 layers: TPMI = 3 | | | | |
| ... | ... | | | | |
| 59 | 3 layers: TPMI = 6 | | | | |
| 60 | 4 layers: TPMI = 3 | | | | |
| 61 | 4 layers: TPMI = 4 | | | | |
| 62-63 | reserved | | | | |

If enhanced precoders in Table 5.1-2A and Table 5.1-3A are used, Table 5.1.3-7A is used in place of Table 7.3.1.1.2-2 in 38.212.

low SINR map a single layer to each subband, while those more focused on spectral efficiency at high SINR map multiple layers to one or more subbands.

TABLE 5.1.3-7A

Precoding information and number of layers, for 4 antenna ports, if transform precoder is disabled and maxRank = 2 or 3 or 4 or if transform precoder is enabled and maxRank = 2 or 3

| Bit field mapped to index | codebookSubset = fullyAndPartialAndNonCoherent | Bit field mapped to index | codebookSubset = partialAndNonCoherent | Bit field mapped to index | codebookSubset= nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| ... | ... | ... | ... | ... | ... |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | reserved |
| ... | ... | ... | ... | | |
| 19 | 1 layer: TPMI = 11 | 19 | 1 layer: TPMI = 11 | | |
| 20 | 2 layers: TPMI = 6 | 20 | 2 layers: TPMI = 6 | | |
| ... | ... | ... | ... | | |
| 35 | 2 layers: TPMI = 21 | 35 | 2 layers: TPMI = 21 | | |
| 36 | 3 layers: TPMI = 1 | 36 | 3 layers: TPMI = 1 | | |
| ... | ... | ... | ... | | |
| 39 | 3 layers: TPMI = 4 | 39 | 3 layers: TPMI = 4 | | |
| 40 | 4 layers: TPMI = 1 | 40 | 4 layers: TPMI = 1 | | |
| 41 | 4 layers: TPMI = 2 | 41 | 4 layers: TPMI = 2 | | |
| 42 | 1 layer: TPMI = 12 | 42-63 | reserved | | |
| ... | ... | | | | |
| 57 | 1 layer: TPMI = 27 | | | | |
| 58 | 2 layers: TPMI = 14 | | | | |
| ... | ... | | | | |
| 65 | 2 layers: TPMI = 21 | | | | |
| 66 | 3 layers: TPMI = 3 | | | | |
| ... | ... | | | | |
| 69 | 3 layers: TPMI = 6 | | | | |
| 70 | 4 layers: TPMI = 3 | | | | |
| 71 | 4 layers: TPMI = 4 | | | | |
| 72-127 | reserved | | | | |

Based on Table 5.1.3-7A, bit length of Precoding information and number of layers is updated:
  4, 6 or 7 bits for 4 antenna ports, according to higher layer parameter codebookSubset;

Some embodiments include discontiguous frequency domain multiantenna PUSCH transmission. DFT-S-OFDM transmissions are mapped to contiguous PRBs (or 'subbands') to maintain low PAPR and CM characteristics of the DFT-S-OFDM waveform on a given transmit chain. However, if there are multiple transmit chains, each transmit chain can transmit on a different set of contiguous PRBs, producing a signal that is discontiguous in the frequency domain, having a number of contiguous subbands equal to the number of transmit chains.

The ability to transmit DFT-S-OFDM in different subbands can be used to provide frequency domain diversity when the channel fades differently across different subbands. Similarly, if the network has measurements of the subband SINRs it would receive, it could schedule a PUSCH in different subbands that have favorable SINRs to improve performance.

When the layers are carried in different subbands, they will not mutually interfere, which has the benefit that the signals can be received at lower SINR. However, transmitting only one layer per subband has the drawback that spectral efficiency is reduced at high SINR. Therefore, embodiments herein that focus on improving performance at Frequency selective precoding, that is, transmitting using different magnitudes or phase over different PRBs or subcarriers, in general increases PAPR and CM. Thus, it is also not used with DFT-S-OFDM, because a primary goal of DFT-S-OFDM transmission is to maintain low PAPR and CM. However, if the a single precoder is applied over an entire subband that is transmitted on a given transmit chain, there is no PAPR or CM increase. Consequently, frequency selective precoding can be achieved by using multilayer transmission with one layer mapped to each transmit chain.

When frequency selective precoding is done on a per transmit chain basis, the precoding may be considered wideband and applies to an entire layer. This is consistent with Rel-15 uplink MIMO which does not define precoder resource group ('PRG') size, and that enables a receiving gNB to presume that any variation in magnitude in the frequency domain is induced by radio propagation. Therefore, a benefit of producing discontiguous frequency domain multilayer PUSCH transmission with one contiguous subband per transmit chain is that the Rel-15 principle of wideband uplink precoding can be maintained.

Given a UE with N transmit chains that transmit in one subband per transmit chain, the next step is to identify N subbands to carry a transmission from the UE. NR bandwidth parts can contain hundreds of PRBs, and so identifying the starting PRB and bandwidth of a given subband can take up the majority of an uplink grant for the transmission, consuming a large amount of overhead on the PDCCH.

Furthermore, the capacity benefit of being able to schedule each subband in a fully flexible manner with any starting point and any bandwidth is likely to be limited. Consequently, methods that limit the amount of DCI signaling to allocate a given UE the subbands for its transmission are desirable.

Embodiments herein contemplate where UEs have an RRC connection to the network and can inform the network of their capability of subband transmission per transmit chain and may be configured for this kind of transmission. In one example, after its RRC connection is established, the UE transmits a PUSCH on a plurality of subbands, each of which occupies contiguous PRBs. The UE maps a set of information bits to the plurality of subbands, the subbands occupying a same OFDM symbol. The methods below describe how to allocate the subband locations to the UE and how to map antenna ports and/or select the subbands for transmission.

More specifically, in an embodiment for multi-antenna transmission in a UE, the UE receives signaling identifying a first and a second subband, wherein the subbands contain contiguous frequency domain resources and at least a portion of the frequency domain resources of one of the subbands is not contained within the other subband. The UE further encodes and maps a set of information bits to the first and the second subband, forming one or more spatial layers according to a mapping of a plurality of antenna ports to the one or more spatial layers. Then the UE transmits the one or more spatial layers in the subbands and within a same OFDM symbol. In some such embodiments, the step of mapping the information bits further comprises transform precoding the layers. An example is illustrated in FIG. 4.

Figure 4:
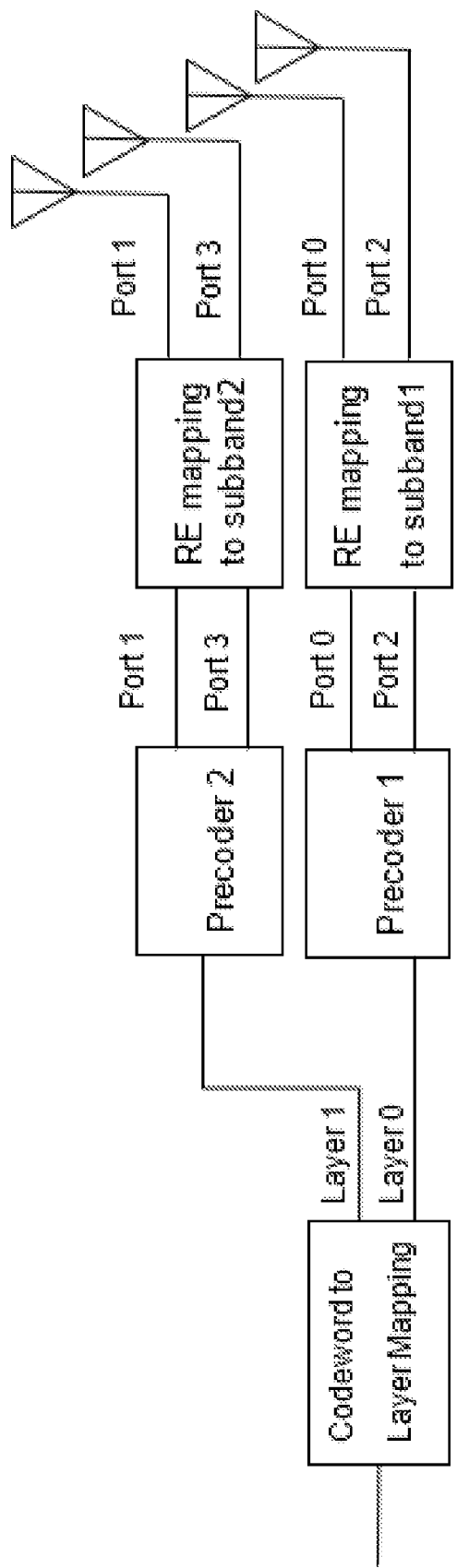
FIG. 4 illustrates an example embodiment with 4 transmit chains and two subbands.

FIG. 4 illustrates an example embodiment with 4 transmit chains and two subbands. The information bits comprised within a MIMO codeword are mapped to two layers in the 'Codeword to Layer Mapping' block. Each layer is mapped to two antennas using the 'Precoder 1' and 'Precoder 2' block, layer 0 is carried on antenna ports 0 and 2, while layer 1 is carried on antenna ports 1 and 3.

The precoder blocks may transform precode (that is, apply DFT-S-OFDM) prior to applying the antenna precoding matrices. Such precoders may either combine the antenna ports coherently when they have multiple non-zero elements, or they may select antennas when they have a single non-zero element.

Lastly, the precoded layers are mapped to the associated subbands, where those of Precoder 1 and 2 are mapped to subbands 1 and 2, respectively. One RE to subband mapping is used to map ports 0 and 2 to subband 1 and another is used to map ports 1 and 3 to subband 2.

Figure 5:
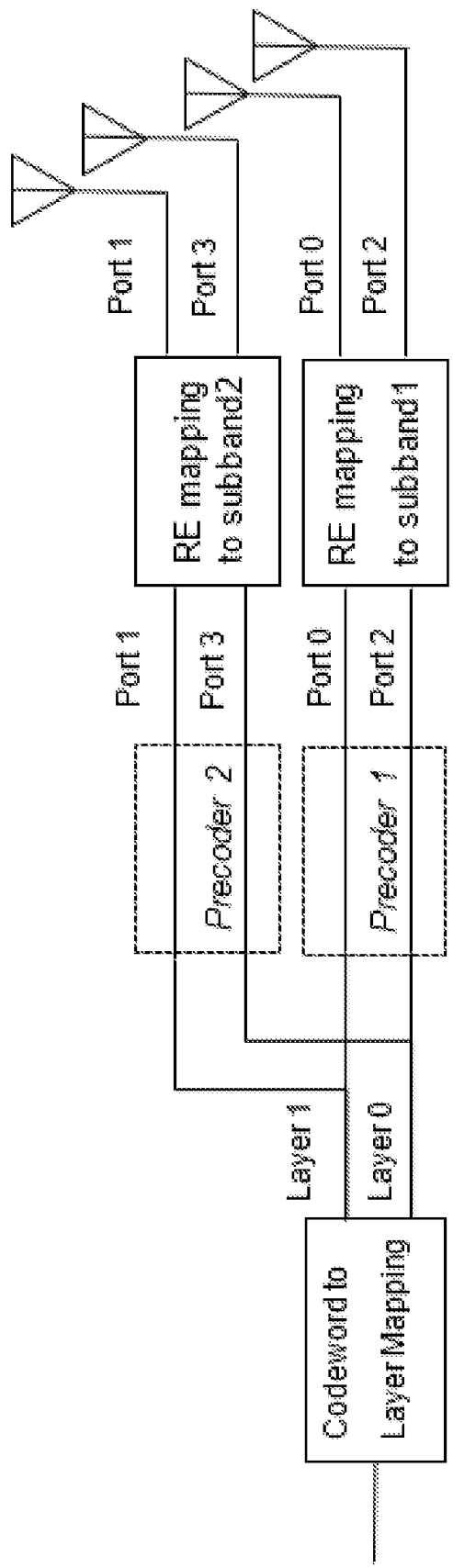
FIG. 5 illustrates a general example suitable for higher SINRs where inter-layer interference can be tolerated to achieve higher spectral efficiency.

FIG. 5 illustrates a more general example suitable for higher SINRs where inter-layer interference can be tolerated to achieve higher spectral efficiency, it is also possible to map multiple layers to a subband, as shown in the example in FIG. 5. Here, layers 0 and 1 are mapped to both subbands 1 and 2. In this example, precoders 1 and 2 are simple diagonal matrices that directly copy the layer (possibly with a scaling factor) to the antenna ports, and so transmit only one layer per antenna port. This is done so that the PAPR and CM do not increase. As in the example above, transform precoding may be applied prior to antenna precoding. The RE to subband mapping behaves as in the example above.

Some embodiments include efficient subband resource allocation for multi-antenna transmission. Rel-15 Type 1 frequency domain resource allocation ('FDRA') is used for DFT-S-OFDM and indicates the start position and length of a contiguous subband for transmission of all PUSCH layers.

The FDRA information consumes $\lceil \log_2(N_{RB}^{UL,BWP}(N_{RB}^{UL,BWP}+1)/2)\rceil$ bits is the number of resource blocks in the scheduled uplink bandwidth part. Assuming that 100 PRBs are in the bandwidth part, the number of bits is then 13 bits are needed for the subband. If all 4 subbands for a 4 transmit chain UE were to be indicated independently, then 4*13=52 bits would be needed for the frequency domain resource allocation alone. Because the entire DCI size is often less than 52 bits, it is desirable to reduce the FDRA signaling overhead.

The amount of overhead for the FDRA should be commensurate with the gains provided by the additional overhead. In scenarios where the gNB has limited knowledge of uplink channel state information but there is sufficient delay spread such that there is frequency selective fading, it may be sufficient to provide widely separated subband transmission that does not track the channel conditions, because this will capture diversity gain. In such cases, the subbands may be separated by a number that is relatively fixed, such as one that is a fraction of the number of PRBs in the bandwidth part. If somewhat more scheduling flexibility is desired, the subbands could be separated by an RRC configured number of PRBs.

In some embodiments for multi-antenna multi-subband transmission, the UE is allocated frequency domain resources for the first subband that indicate a starting PRB index and a number of contiguous PRBs. The UE determines resources for the second subband by adding an integer offset to the starting PRB index. In some such embodiments, each subband is identified at least in part by a PRB index and the first subband is the subband with a smallest PRB index of the PRB indices associated with the subbands.

The offset can be separately configured or a value fixed in specification. In some embodiments, the value fixed in specification is a number of PRBs determined as a fraction of a bandwidth part that carries the transmission from the UE, such as $\lfloor N_{BWP}^{size}/2 \rfloor$ or $\lfloor N_{BWP}^{size}/4 \rfloor$, where $N_{BWP}^{size}$ is the size of the bandwidth part in units of PRBs. In some embodiments, the starting resource block in the frequency domain resource allocation for each of the subbands is further determined according to $$RB_{start} = \begin{cases} RB_{start} & i = 0 \\ (RB_{start} + i \cdot RB_{offset}) \bmod N_{BWP}^{size} & i > 0 \end{cases}$$

Where $RB_{start}$ is the starting PRB index, $RB_{offset}$ is the offset between each subband, and i is index of the subband, where $0 \leq i \leq N$ and N is the number of transmit chains, and i=0 corresponds to the first subband. In some embodiments, $RB_{offset}$ is conveyed directly to the UE as a parameter in higher layer signaling, while in other embodiments it is calculated from system parameters and the number of subbands to transmit, for example, $RB_{offset} = \lfloor N_{BWP}^{size}/N \rfloor$. An example is illustrated in FIG. 6.

Figure 6:
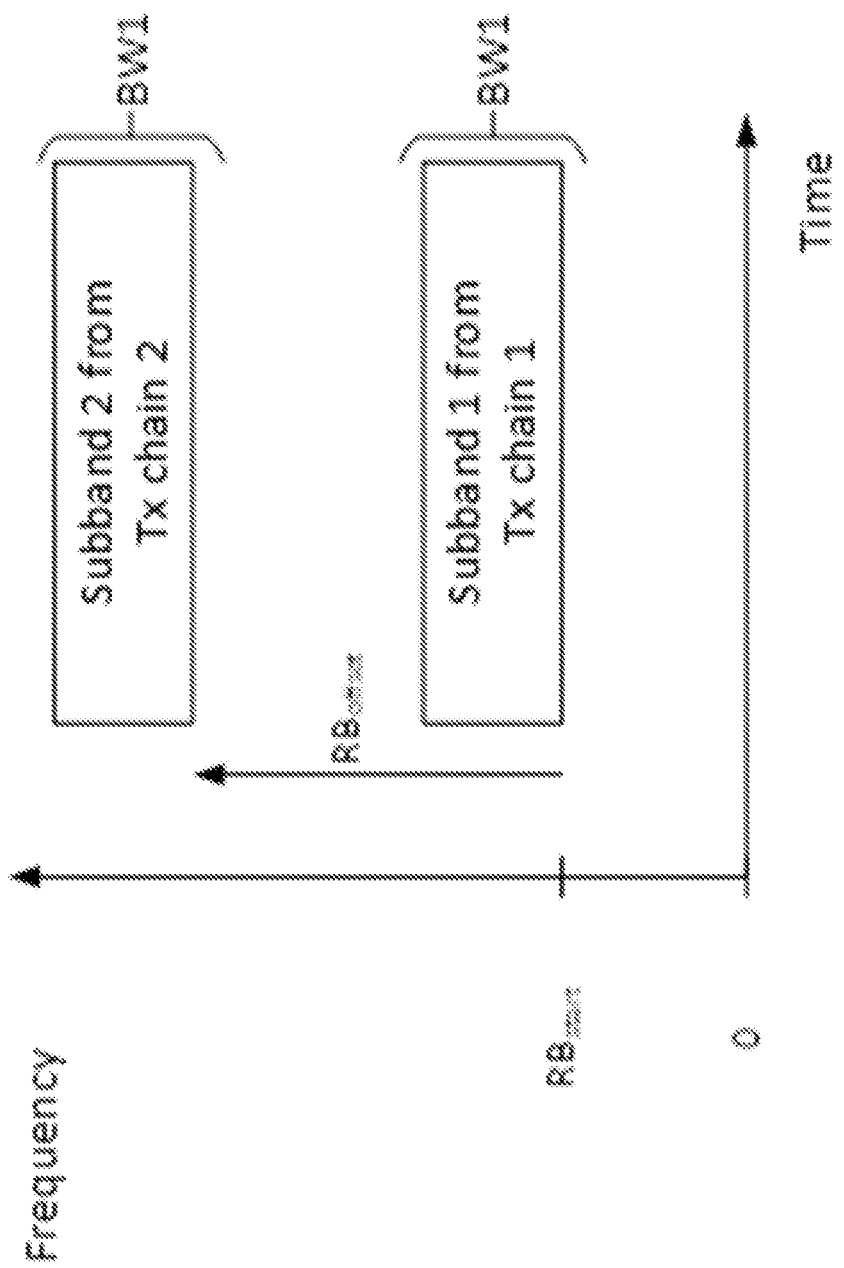
FIG. 6 is a time and frequency diagram illustrating an example of subband resource allocation for multi-antenna transmission.

FIG. 6 is a time and frequency diagram illustrating an example of subband resource allocation for multi-antenna transmission. The horizontal axis represents time and the vertical axis represents frequency.

Two subbands are illustrated, where each is transmitted on one of two transmit chains. The first subband starts in a first PRB labeled 'PRBstart' and has a bandwidth (measured in PRBs) labeled 'BW1'. Note that the PRBs are indexed such that the start of the bandwidth part is PRB #0.The second subband is offset from the first by a predetermined number of PRBs labeled as $\Delta f$.

Some embodiments include antenna port mapping and subband selection. Multiple transmit chain transmission normally uses a distinct antenna port for each layer that is identified by a demodulation reference signal (DMRS) that is distinct from the other layers. This is because different layers are carried on different effective channels, and it is necessary to estimate the effective channels to suppress inter-layer interference. However, if the MIMO layers are transmitted in unique frequency domain resources for each layer such that they do not overlap and therefore the MIMO layers do not interfere, it is not strictly necessary to use a distinct antenna port for each MIMO layer.

In such cases, a single antenna port may be used per subband. However, there are drawbacks with using a single antenna port, because the network will generally assume that frequency selective precoding is not used on a given MIMO layer, and so may attempt to average channel estimates for an antenna port across nearby PRBs. Because the different antennas and/or precoding may be used for different subbands, the effective channel can vary quickly in the frequency domain, and averaging across PRBs may average dissimilar channels, thereby degrading channel estimation performance. Consequently, it may be beneficial to use distinct antenna ports in each subband.

SRS ports are used to measure the effective channel associated with the transmit chains they are carried on. Therefore, an SRS port may be associated with a subband of the embodiments to estimate the channel for that subband. Similarly, DMRS ports are used to measure the effective channel of a PUSCH layer after precoding, and so DMRS ports and MIMO layers can alternatively or additionally be associated with a subband to estimate the effective channel of the PUSCH layer after precoding.

In some embodiments, the first and the second subband are each associated with a first and a second set of antenna ports, respectively. In some embodiments, the first and the second subbands are each associated with a spatial multiplexing layer. In some embodiments, a single precoder may be used for the entire subband.

A UE may be configured to always transmit in a fixed number of subbands. However, this will likely lead to less efficient use of uplink resources and is inconsistent with the dynamic rank and MCS adaptation as well as the dynamic indication of frequency hopping via DCI that is supported in Rel-15 NR. Consequently, the number of subbands used for the transmission should be conveyed to the UE.

Because the embodiments herein couple FDRA to multi-antenna transmission, it is possible to allocate frequency domain resources via the use of spatial parameters like the number of layers or the precoder to use for PUSCH transmission. Alternatively, the subbands that are to be transmitted upon may be directly indicated in DCI, and the mapping of SRS and/or DMRS ports to subbands may be one to one and fixed in specification.

Therefore, in some embodiments, the UE uses a precoder for transmission on a subband of the first and second subband, and when the precoder contains a non-zero element corresponding to a first or a second antenna port, the UE transmits with non-zero power on the subband of the first and second subband.

In an alternative embodiment, the UE receives an indication comprising one of if the UE is to transmit on the first subband and if the UE is to transmit on both the first and second subbands. The UE transmits the one or more spatial layers in the first and the second subband, respectively, according to an antenna port associated with the first and second subband, respectively.

For the following examples, the number of UE antenna ports is denoted as P, the number of UE antenna ports for the first and second subband are denoted as P1 and P2 respectively, the number of subbands is denoted as S, and the numbers of spatial layers for the first and the second subband are denoted L1 and L2 respectively. Because each port can be in only one subband, P1+P2=P. Also, each transmit chain can carry only one subband, so P>=S.

In some embodiments, one or more TPMIs for multiple subbands are indicated by one or more of the methods below.

For codebook based PUSCH transmission, for Option 1a, one TPMI is configured per subband, of size P×L1 or P×L2. S TPMIs for multiple subbands are configured in the increasing order of subband's PRB index. The number of rows with non-zero value of a matrix indicated by TPMI indicates the number of antenna ports for the subband. This option facilitates each transmit chain to be mapped to any antenna port.

A variant of Option 1a is that only TPMI of one subband is configured. The other subband uses antenna ports identified as 0 in matrix of the TPMI. The co-phasing factor and amplitude factor can be separately configured or predetermined, e.g. 1.

For Option 1b, one TPMI is configured per subband, of size P1×L1 or P2×L2. Additional signaling is needed to indicate which set of antenna ports is associated with each subband. Option 1b is not used for 2-AP UE.

For Option 2, one TPMI is configured for all subbands of size P×(L1+L2). Precoders for all subbands are placed side by side in the increasing order of subband's PRB index.

For Option 3, one TPMI is configured per layer. Precoders for all layers of all subbands are concatenated in the increasing order of layer index within one subband and then subband's PRB index. Additional signaling is needed to indicate the number of layers for each subband. If there is only one layer for each subband, Option 3 is the same as Option 1a.

For non-codebook based PUSCH transmission, SRI for layers of each subbands are configured in the increasing order of layer index within one subband and then subband's PRB index. The number of layers for each subband is separately configured.

In some embodiments, the number of spatial layers for each subband can be indicated by one or more of below methods. In one method, the number of spatial layers for each subband is separately or jointly indicated. If the total number of spatial layers L is indicated as in R15, i.e., by TRI for CB-based PUSCH transmission or number of SRI for non-CB based PUSCH transmission, the number of spatial layers for the first subband is equal to floor(L/2) and that for the second subband is equal to L-floor(L/2).

In some embodiments, the number of subbands S can be separately configured and/or implicitly indicated by number of TPMI in Option 1 above.

For example, for UE with 2 antenna ports and configured with 2 subbands and each subband on one of 2 antenna ports, the subband with low PRB index $RB_0$, i.e. subband 1, is transmitted with AP #0 and the one with high PRB index $RB_1$ on AP #1 can be configured according to FIG. 7 as follows.

Figure 7:
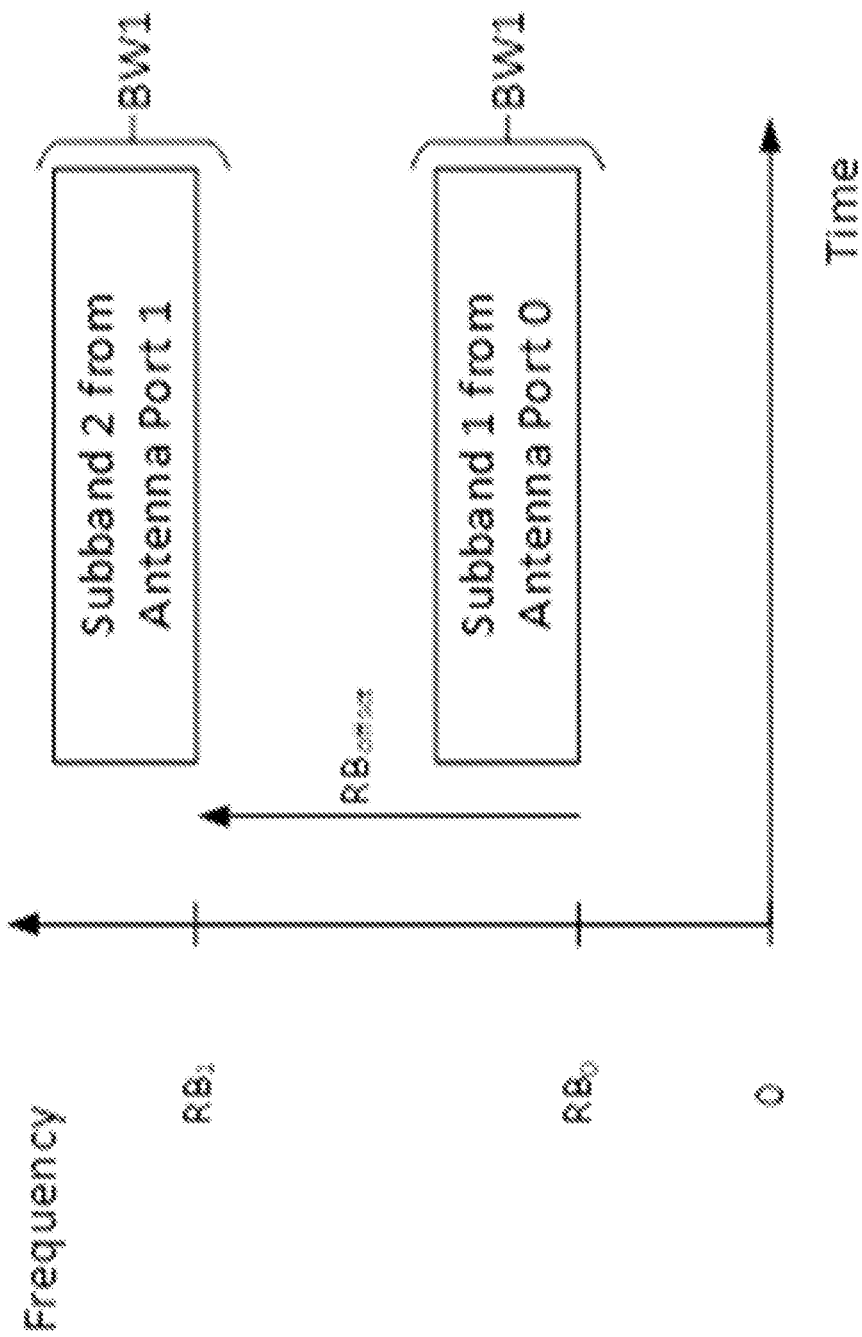
FIG. 7 is a time and frequency diagram illustrating another example of subband resource allocation for multi-antenna transmission.

FIG. 7 is a time and frequency diagram illustrating another example of subband resource allocation for multi-antenna transmission. The horizontal axis represents time and the vertical axis represents frequency.

Therefore, P=2, L1=L2=1, S=2. TPMI can be configured as below. All options below result in the same precoding.

Option 1a, 3: $\begin{bmatrix}1\\0\end{bmatrix}, \begin{bmatrix}0\\1\end{bmatrix}$ Option 2: $\begin{bmatrix}1&0\\0&1\end{bmatrix}$ In another example, for UE with 4 antenna ports and configured with 2 subbands, each subband carries 2 antenna ports and 1 or 2 layers, i.e., P=4, P1=2, P2=2, L1=L2=1 or 2, S=2.

TPMI can be indicated as below, considering two different cases where one layer per subband and two layers per subband are used. In the first case, multiple ports combine onto a layer, such as when the UE support fully coherent uplink MIMO, whereas the second case maps one port to a layer, such as when the UE supports non-coherent uplink MIMO. All options below result in the same precoding for each of the cases, although the precoding is different between cases. In all cases and options, the power per subband is normalized, so a $1/\sqrt{2}$ scaling factor is applied, as there will be two transmit chains transmitting on a subband in all the cases and options in the example here.

Option 1a:

With one layer per subband: $\frac{1}{\sqrt{2}}\begin{bmatrix}1\\0\\1\\0\end{bmatrix}, \frac{1}{\sqrt{2}}\begin{bmatrix}0\\1\\0\\-j\end{bmatrix}$ With two layers per subband: $\frac{1}{\sqrt{2}}\begin{bmatrix}1&0\\0&1\\0&0\\0&0\end{bmatrix}, \frac{1}{\sqrt{2}}\begin{bmatrix}0&0\\0&0\\1&0\\0&1\end{bmatrix}$, Option 1b:
With one layer per subband:

$\frac{1}{\sqrt{2}}\begin{bmatrix}1\\1\end{bmatrix}, \frac{1}{\sqrt{2}}\begin{bmatrix}1\\-j\end{bmatrix}$ With two layers per subband:

$\frac{1}{\sqrt{2}}\begin{bmatrix}1&0\\0&1\end{bmatrix}\frac{1}{\sqrt{2}}\begin{bmatrix}1&0\\0&1\end{bmatrix}$ Option 2:
With one layer per subband:

$\frac{1}{\sqrt{2}}\begin{bmatrix}1&0\\0&1\\1&0\\0&-j\end{bmatrix}$

With two layers per subband:

$\frac{1}{\sqrt{2}}\begin{bmatrix}1&0&0&0\\0&1&0&0\\0&0&1&0\\0&0&0&1\end{bmatrix}$ Option 3:
With one layer per subband:

$\frac{1}{\sqrt{2}}\begin{bmatrix}1\\0\\1\\0\end{bmatrix}, \frac{1}{\sqrt{2}}\begin{bmatrix}1\\0\\-j\\0\end{bmatrix}$ With two layers per subband:

$\frac{1}{\sqrt{2}}\begin{bmatrix}1\\0\\0\\0\end{bmatrix}, \frac{1}{\sqrt{2}}\begin{bmatrix}0\\1\\0\\0\end{bmatrix}, \frac{1}{\sqrt{2}}\begin{bmatrix}0\\0\\1\\0\end{bmatrix}, \frac{1}{\sqrt{2}}\begin{bmatrix}0\\0\\0\\1\end{bmatrix}$, In an embodiment for a UE with 2 antenna ports supporting 2 subbands, the precoding matrix for each subband can reuse matrices with TPMI 0 and 1 in Table 6.3.1.5-1 in 38.211, quoted in subclause 2.1.2.3. A variant is that TPMI 0 and 1 can be respectively revised to be $\begin{bmatrix}1\\0\end{bmatrix}, \begin{bmatrix}0\\1\end{bmatrix}.$ In an embodiment for a UE with 4 antenna ports supporting 2 subbands with one layer per subband, the matrix for each subband can reuse matrices of TPMI 0~11 in Table 6.3.1.5-2 and Table 6.3.1.5-3 in 3GPP TS 38.211, quoted in subclause 2.1.2.3. A variant is that in both tables, the scaling factor of TPMI 0~3 is changed to 1 and that of TPMI 4~11 is changed to $1/\sqrt{2}$ In an embodiment for a UE with 4 antenna ports supporting 2 subbands with two layers per subband, for Option 1b, the matrix for each subband can reuse matrices of TPMI 1~2 in Table 6.3.1.5-4 in 3GPP TS 38.211, quoted in subclause 2.1.2.3. A variant is that the scaling factor of TPMI 1~2 is changed to $1/\sqrt{2}$. For Option 2, the matrix for all subbands can reuse matrices of TPMI 0~2 in Table 6.3.1.5-7. A variant is that the scaling factor of TPMI 0 is changed to 1 and that of TPMI 1~2 is changed to ½.

Figure 8:
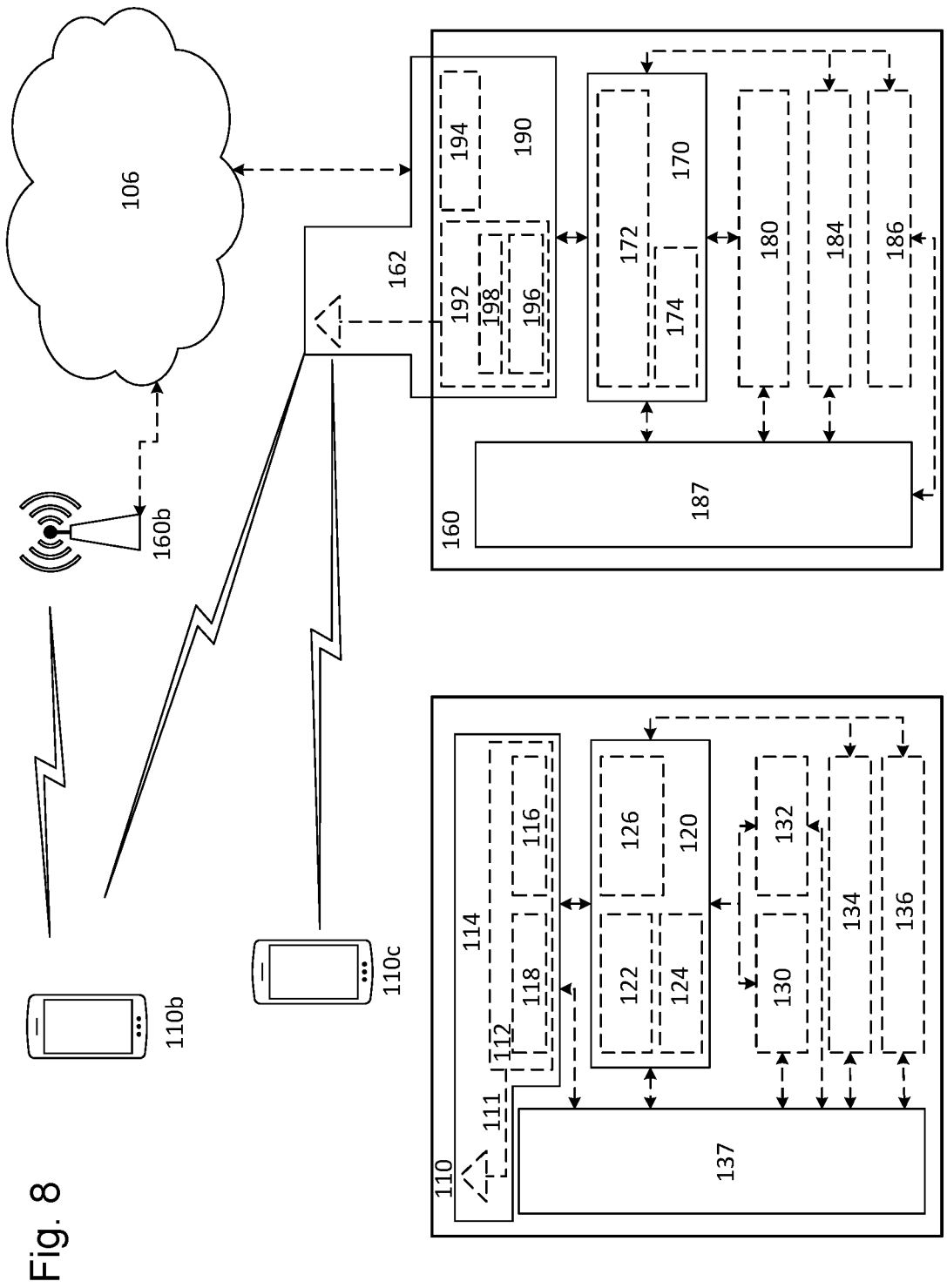
FIG. 8 is a block diagram illustrating an example wireless network.

FIG. 8 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 160 includes processing circuitry 170, device readable medium 180, interface 190, auxiliary equipment 184, power source 186, power circuitry 187, and antenna 162. Although network node 160 illustrated in the example wireless network of FIG. 8 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 8 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 9:
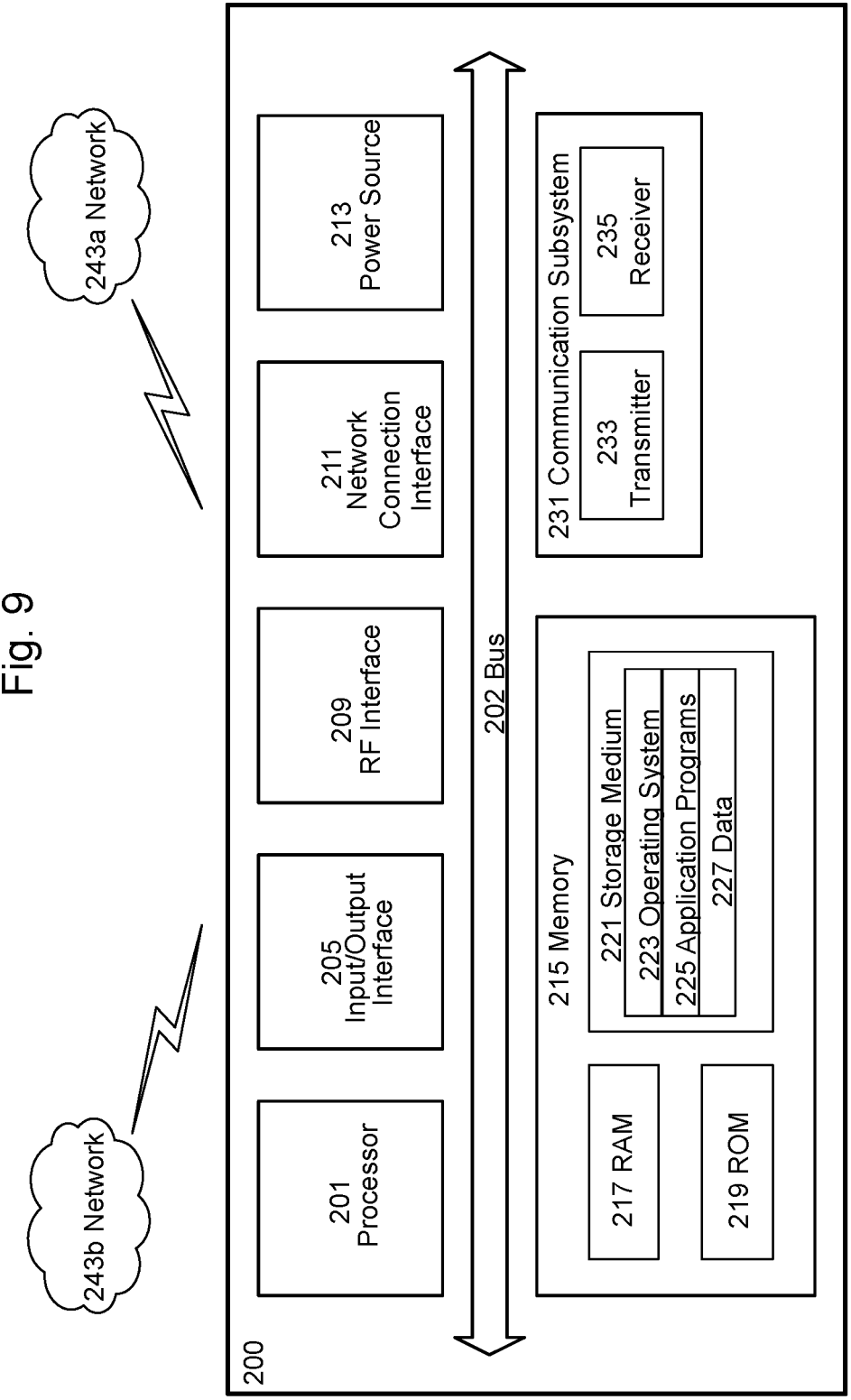
FIG. 9 illustrates an example user equipment, according to certain embodiments.

FIG. 9 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 9, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 10A:
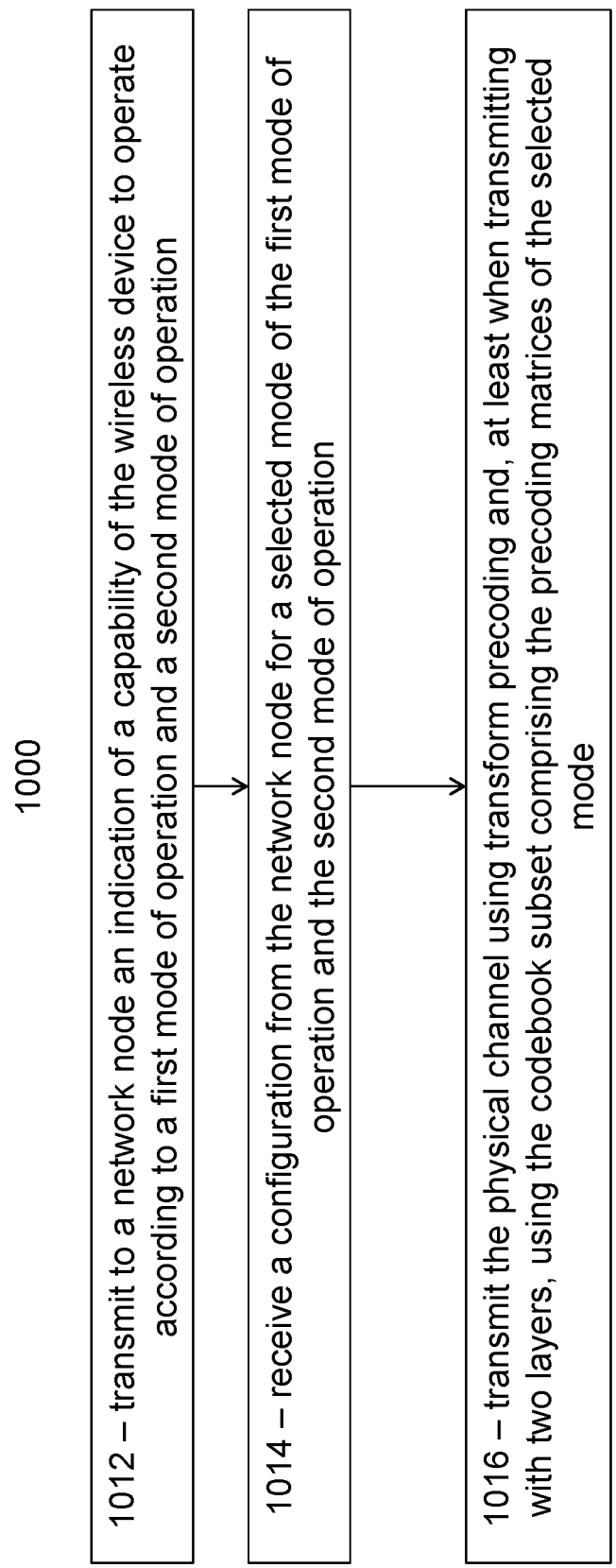

FIG. 10A is a flowchart illustrating an example method in a wireless device, according to certain embodiments. In particular embodiments, one or more steps of FIG. 10A may be performed by wireless device 110 described with respect to FIG. 8.

The method begins at step 1012, where the wireless device (e.g., wireless device 110) transmits to a network node (e.g., network node 160) an indication of a capability of the wireless device to operate according to a first mode of operation and a second mode of operation. In the first mode of operation a codebook subset comprises precoding matrices with at most one non-zero elements per column, and in the second mode of operation the codebook subset comprises precoding matrices with at most two non-zero elements per column. The codebook subset is in a codebook that is designated for use when transform precoding of a physical channel is disabled.

In particular embodiments, the first mode of operation is associated with a non-coherent codebook and the second mode of operation is associated with one of a non-coherent codebook and a partially-coherent codebook.

At step 1014, the wireless device receiving a configuration from the network node for a selected mode of the first mode of operation and the second mode of operation. For example, the network node indicates to the wireless device its preferred mode of operation.

At step 1016, the wireless device transmits the physical channel using transform precoding and, at least when transmitting with two layers, using the codebook subset comprising the precoding matrices of the selected mode.

In some embodiments, for a third mode of operation the codebook subset further comprises precoding matrices with more than two non-zero elements for use with single layer transmission. The indication transmitted to the network node indicates capability for the third mode of operation, the selected mode is the third mode, and transmitting the physical channel comprises transmitting the physical channel with one layer.

The codebooks and modes of operation may comprise any of the codebooks and modes of operation described with respect to any of the embodiments and examples described herein.

Modifications, additions, or omissions may be made to method 1000 of FIG. 10A. Additionally, one or more steps in the method of FIG. 10A may be performed in parallel or in any suitable order.

FIG. 10B is a flowchart illustrating another example method in a wireless device, according to certain embodiments. In particular embodiments, one or more steps of FIG. 10B may be performed by wireless device 110 described with respect to FIG. 8.

The method begins at step 1052, where the wireless device (e.g., wireless device 110) receives signaling identifying a first and a second subband. The subbands contain contiguous frequency domain resources, and at least a portion of the frequency domain resources of one of the subbands is not contained within the other subband.

At step 1054, the wireless device may receive an allocation of frequency domain resources for the first subband that indicate a starting PRB index and a number of contiguous PRBs and determining frequency domain resources for the second subband by adding an integer offset to the starting PRB index.

At step 1056, the wireless device encodes and maps a set of information bits to the first and the second subband, thereby forming one or more spatial layers according to a mapping of a plurality of antenna ports to the one or more spatial layers, according to any of the embodiments and examples described herein.

At step 1058, the wireless device transmits the one or more spatial layers in the subbands and within a same OFDM symbol.

Modifications, additions, or omissions may be made to method 1050 of FIG. 10B. Additionally, one or more steps in the method of FIG. 10B may be performed in parallel or in any suitable order.

Figure 11A:
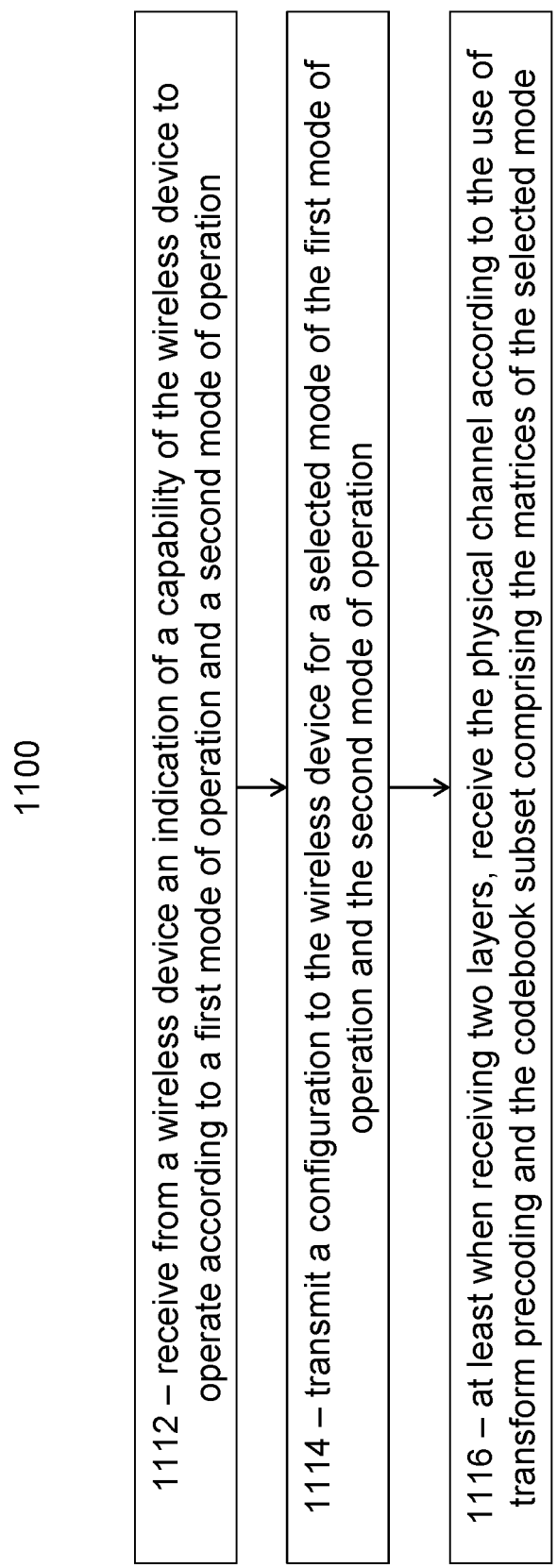
FIGS. 11A and 11B are flowcharts illustrating example methods in a network node, according to certain embodiments.

FIG. 11A is a flowchart illustrating an example method in a network node, according to certain embodiments. In particular embodiments, one or more steps of FIG. 11A may be performed by network node 160 described with respect to FIG. 8.

The method begins at step 1112, where the network node (e.g., network node 160) receives from a wireless device an indication of a capability of the wireless device to operate according to a first mode of operation and a second mode of operation. In the first mode of operation a codebook subset comprises precoding matrices with at most one non-zero elements per column, and in the second mode of operation the codebook subset comprises precoding matrices with at most two non-zero elements per column. The codebook subset is in a codebook that can be configured when transform precoding of a physical channel is disabled.

The codebooks and modes of operation are described with respect to FIG. 10A and according to any of the embodiments and examples described herein.

At step 1114, the network node transmits a configuration to the wireless device for a selected mode of the first mode of operation and the second mode of operation. For example, the network node sends its preferred mode of operation to the wireless device.

At step 1116, the network node, at least when receiving two layers, receives the physical channel according to the use of transform precoding and the codebook subset comprising the matrices of the selected mode.

Modifications, additions, or omissions may be made to method 1100 of FIG. 11A. Additionally, one or more steps in the method of FIG. 11A may be performed in parallel or in any suitable order.

Figure 11B:
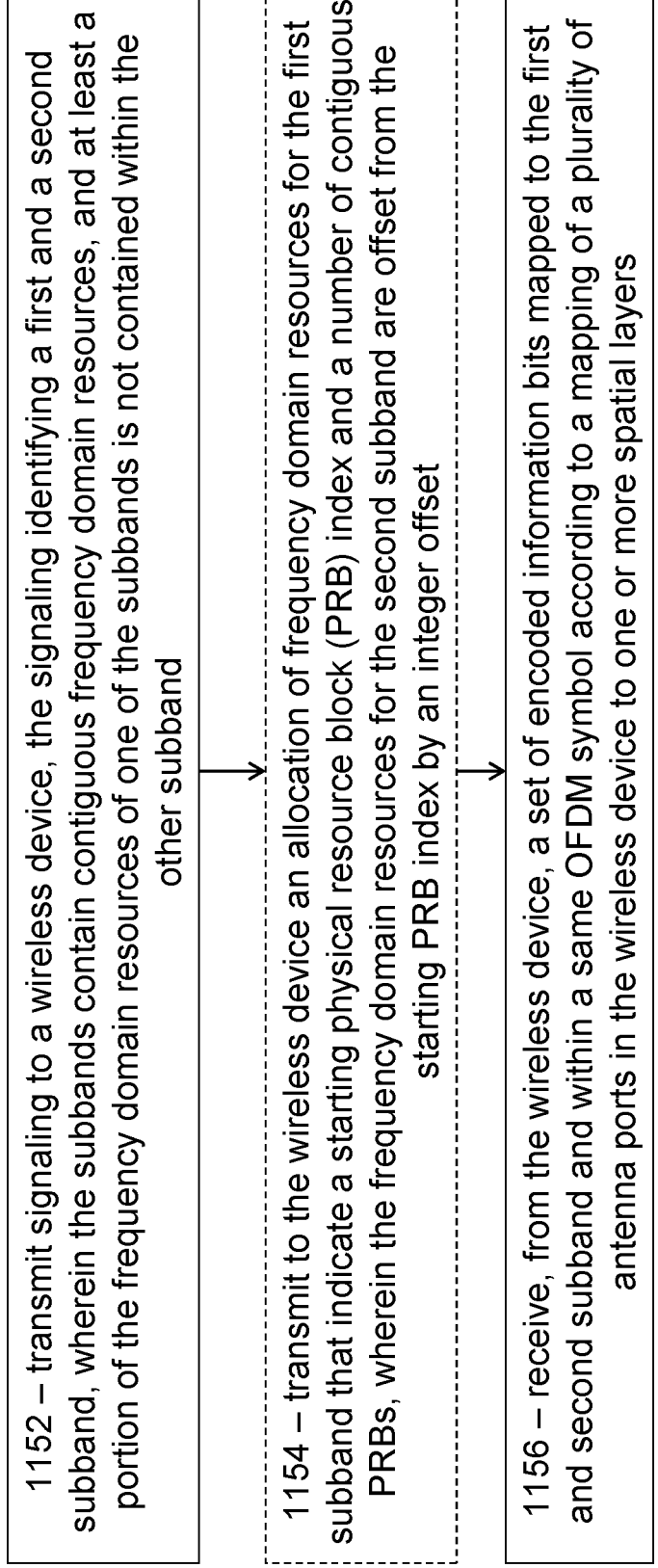

FIG. 11B is a flowchart illustrating another example method in a network node, according to certain embodiments. In particular embodiments, one or more steps of FIG. 11B may be performed by network node 160 described with respect to FIG. 8.

The method begins at step 1152, where the network node (e.g., network node 160) transmits signaling to a wireless device. The signaling identifies a first and a second subband, wherein the subbands contain contiguous frequency domain resources, and at least a portion of the frequency domain resources of one of the subbands is not contained within the other subband.

At step 1154, the network node may transmit to the wireless device an allocation of frequency domain resources for the first subband that indicate a starting PRB index and a number of contiguous PRBs, wherein the frequency domain resources for the second subband are offset from the starting PRB index by an integer offset.

At step 1156, the network node receives, from the wireless device, a set of encoded information bits mapped to the first and second subband and within a same OFDM symbol according to a mapping of a plurality of antenna ports in the wireless device to one or more spatial layers.

Modifications, additions, or omissions may be made to method 1100 of FIG. 11B. Additionally, one or more steps in the method of FIG. 11B may be performed in parallel or in any suitable order.

Figure 12:
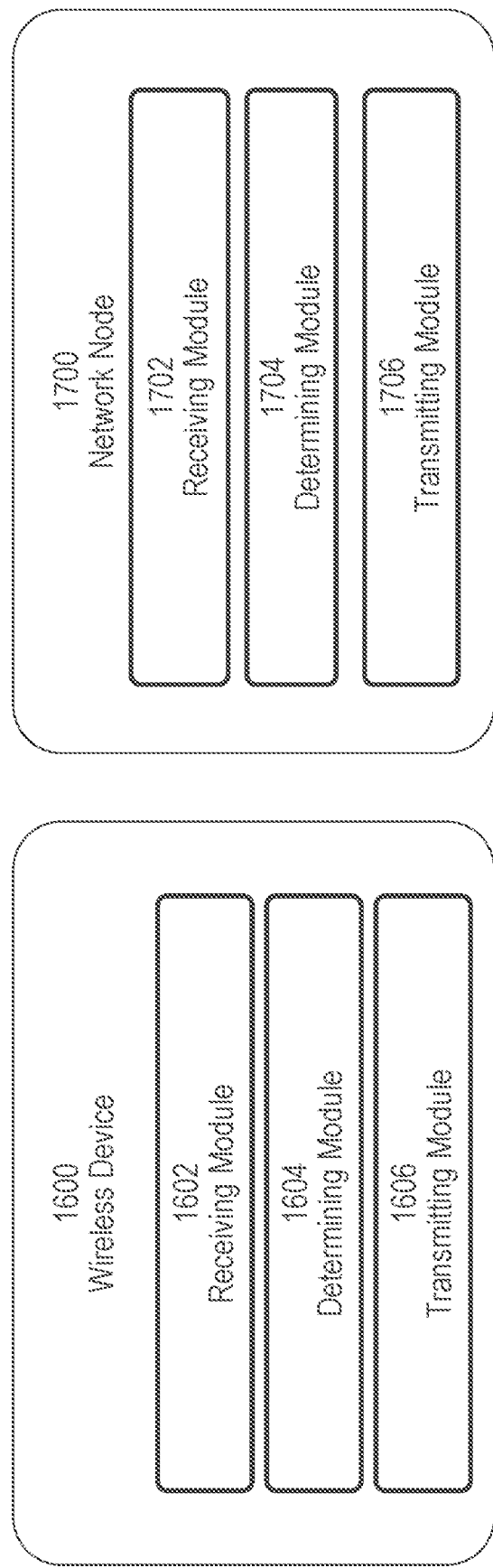
FIG. 12 illustrates a schematic block diagram of a wireless device and a network node in a wireless network, according to certain embodiments.

FIG. 12 illustrates a schematic block diagram of two apparatuses in a wireless network (for example, the wireless network illustrated in FIG. 8). The apparatuses include a wireless device and a network node (e.g., wireless device 110 and network node 160 illustrated in FIG. 8). Apparatuses 1600 and 1700 are operable to carry out the example methods described with reference to FIGS. 10A and 10B and FIGS. 11A and 11B, respectively, and possibly any other processes or methods disclosed herein. It is also to be understood that the methods of FIGS. 10A and 10B and FIGS. 11A and 11B are not necessarily carried out solely by apparatuses 1600 and/or 1700. At least some operations of the methods can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, transmitting module 1606, and any other suitable units of apparatus 1600 to perform corresponding functions according one or more embodiments of the present disclosure. Similarly, the processing circuitry described above may be used to cause receiving module 1702, determining module 1704, transmitting module 1706, and any other suitable units of apparatus 1700 to perform corresponding functions according one or more embodiments of the present disclosure.

As illustrated in FIG. 12, apparatus 1600 includes receiving module 1602 configured to receive a selected mode of operation according to any of the embodiments and examples described herein. Determining module 1604 is configured to determine precoding matrices and modes of operation according to any of the embodiments and examples described herein. Transmitting module 1606 is configured to transmit uplink data, according to any of the embodiments and examples described herein.

As illustrated in FIG. 12, apparatus 1700 includes receiving module 1702 configured to receive uplink data according to any of the embodiments and examples described herein. Determining module 1704 is configured to determine precoding matrices and modes of operation according to any of the embodiments and examples described herein. Transmitting module 1706 is configured to transmit control information to a wireless device, according to any of the embodiments and examples described herein.

Figure 13:
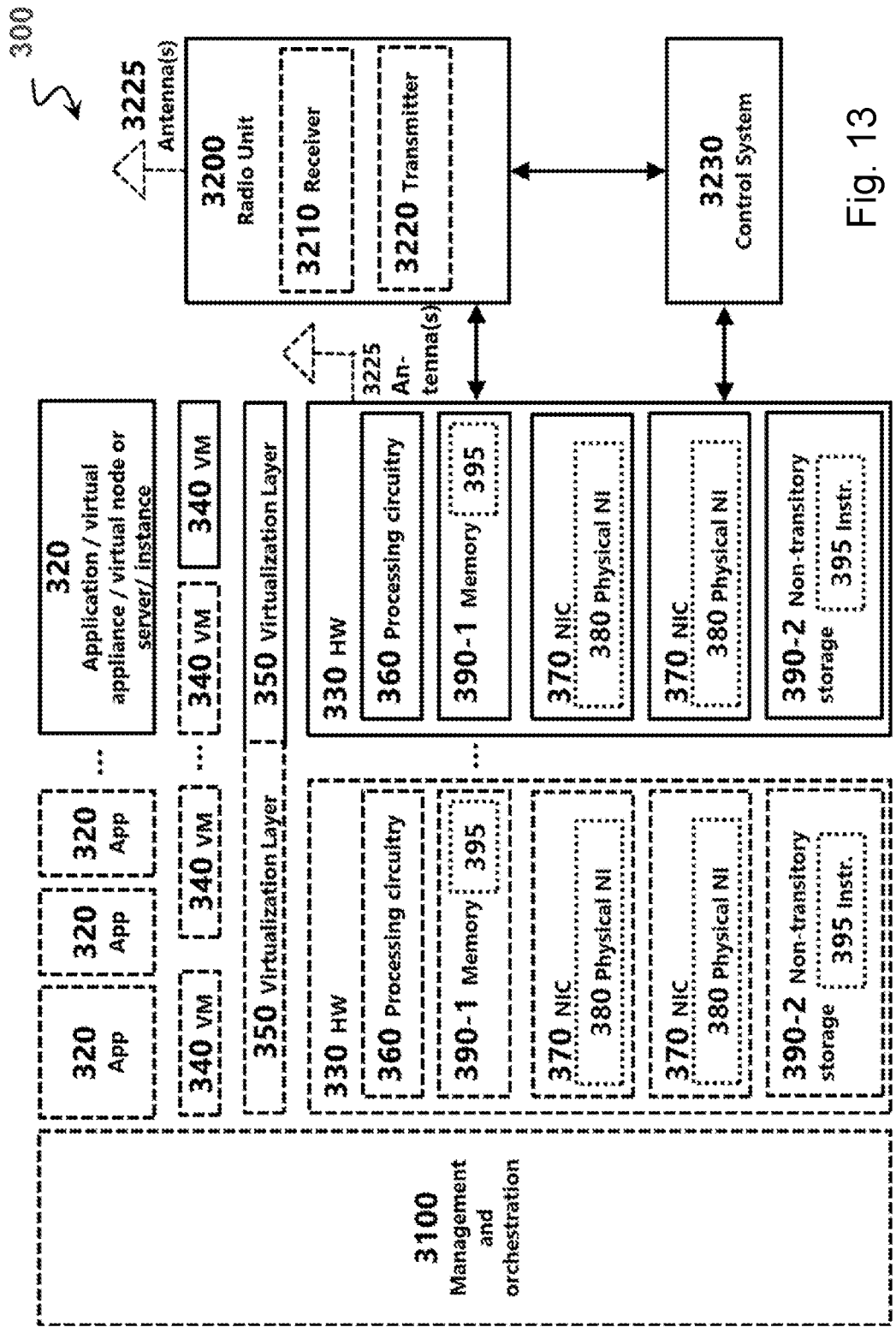
FIG. 13 illustrates an example virtualization environment, according to certain embodiments.

FIG. 13 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 13, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Figure 18:
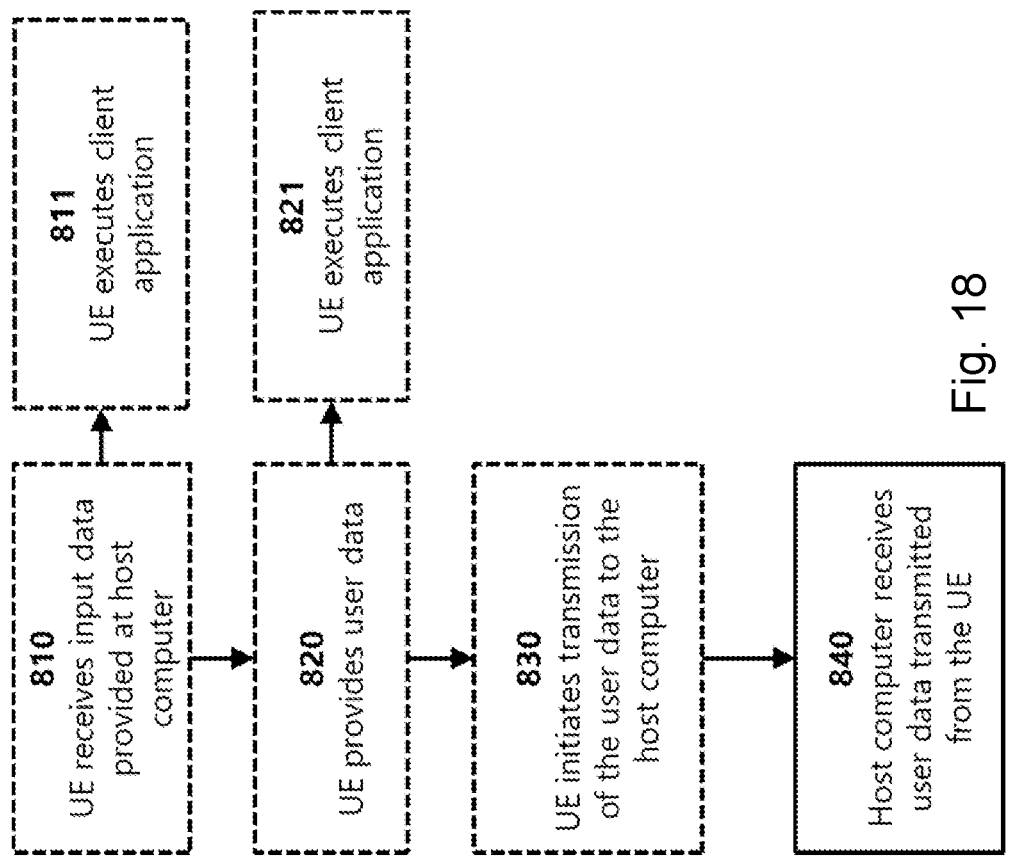
FIG. 18 is a flowchart illustrating a method implemented in a communication system, according to certain embodiments.

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 14:
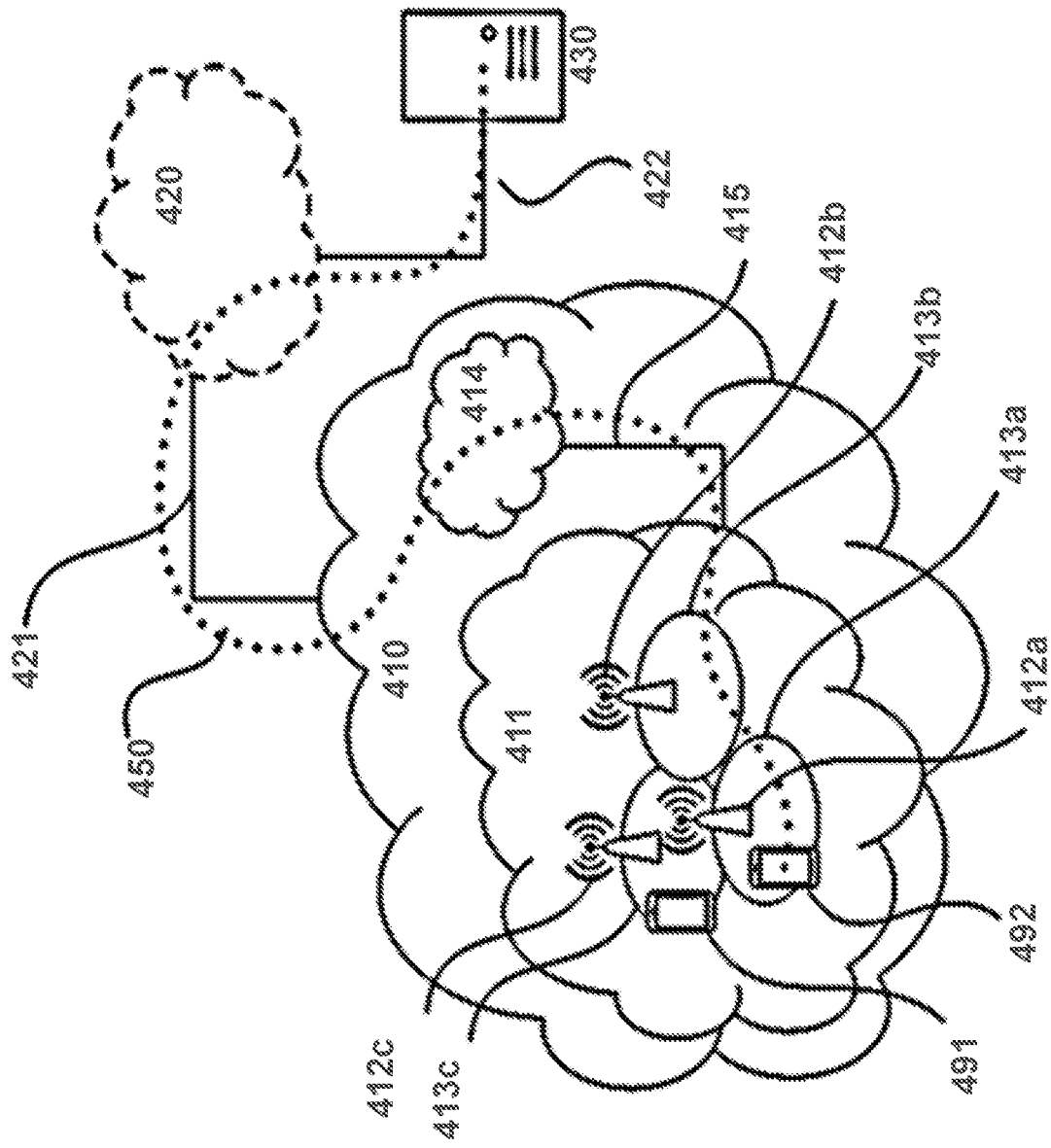
FIG. 14 illustrates an example telecommunication network connected via an intermediate network to a host computer, according to certain embodiments.

With reference to FIG. 14, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 14 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 15:
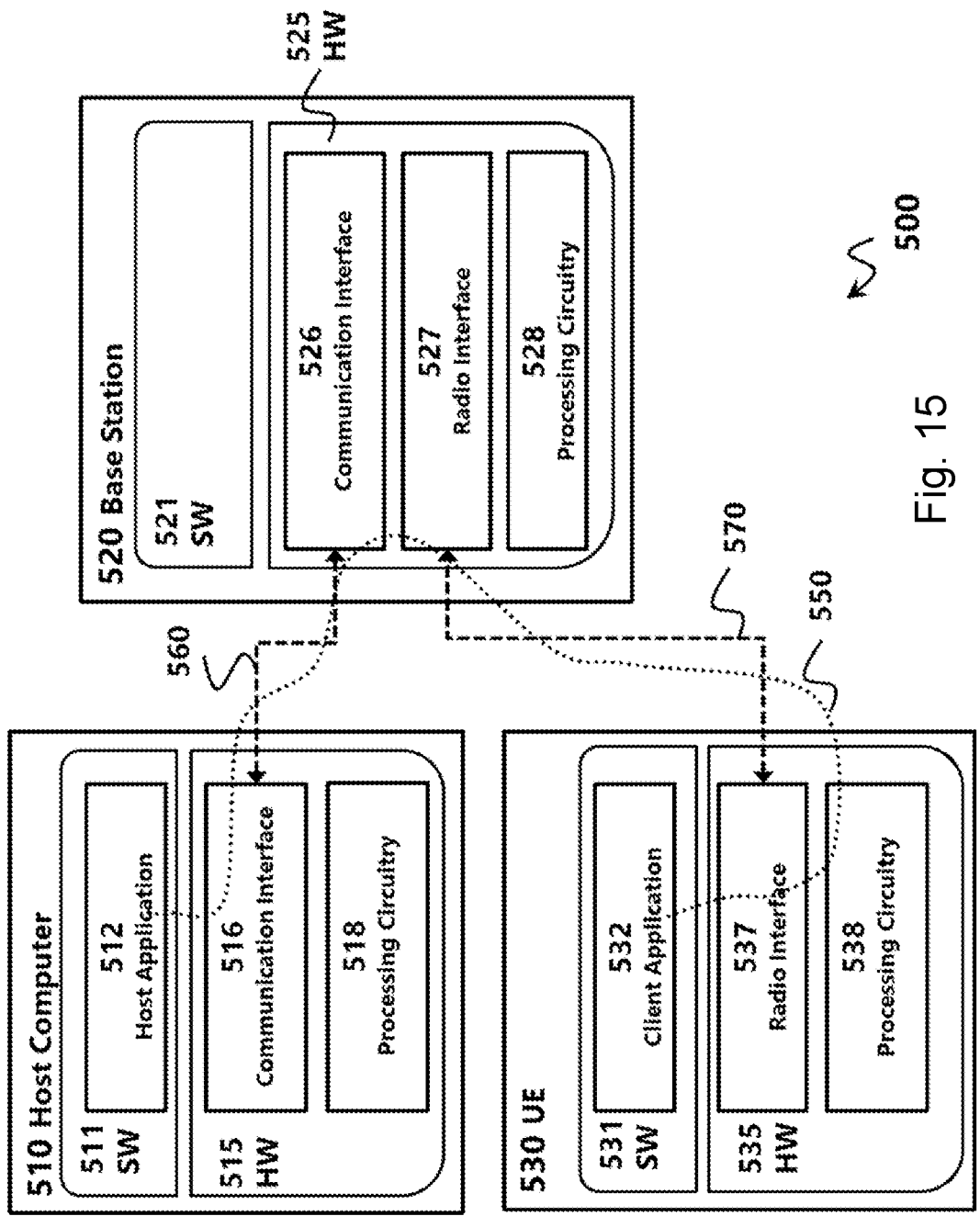
FIG. 15 illustrates an example host computer communicating via a base station with a user equipment over a partially wireless connection, according to certain embodiments.

FIG. 15 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 15. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 15) served by base station 520. Communication interface 526 may be configured to facilitate connection 560 to host computer 510. Connection 560 may be direct, or it may pass through a core network (not shown in FIG. 15) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 15 may be similar or identical to host computer 430, one of base stations 412a, 412b, 412c and one of UEs 491, 492 of FIG. 13, respectively. This is to say, the inner workings of these entities may be as shown in FIG. 15 and independently, the surrounding network topology may be that of FIG. 13.

In FIG. 15, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 16:
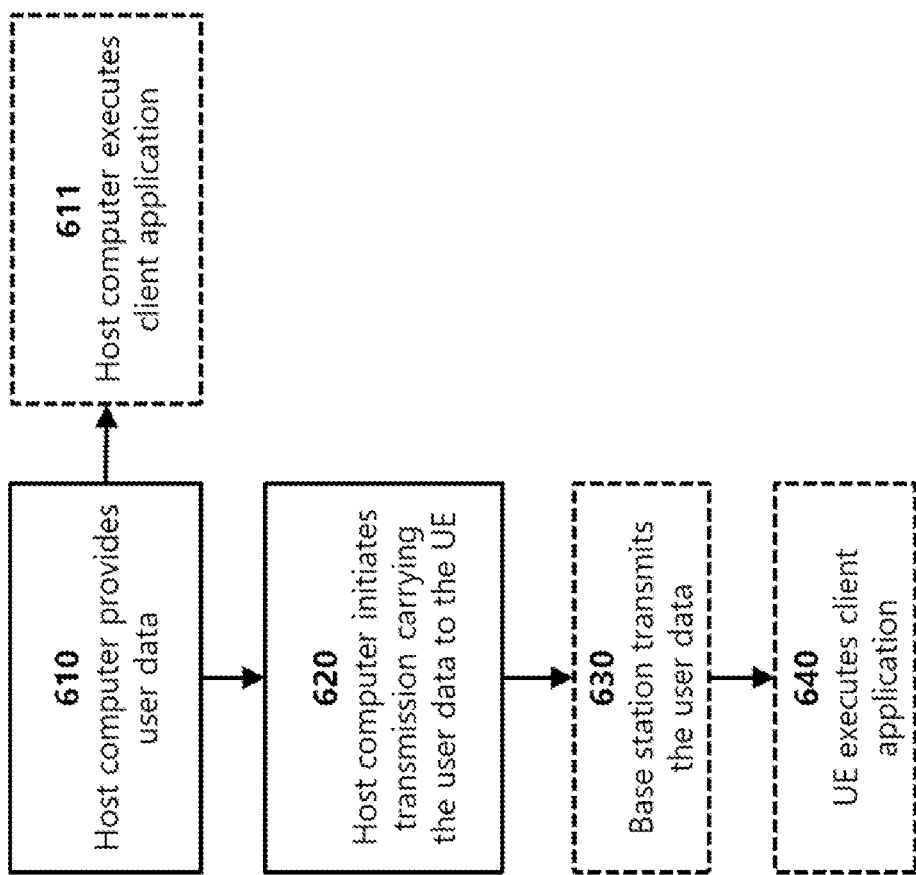
FIG. 16 is a flowchart illustrating a method implemented, according to certain embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 17:
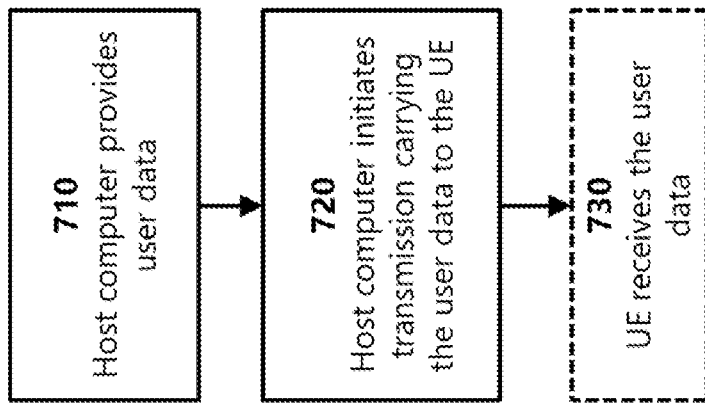
FIG. 17 is a flowchart illustrating a method implemented in a communication system, according to certain embodiments.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 19:
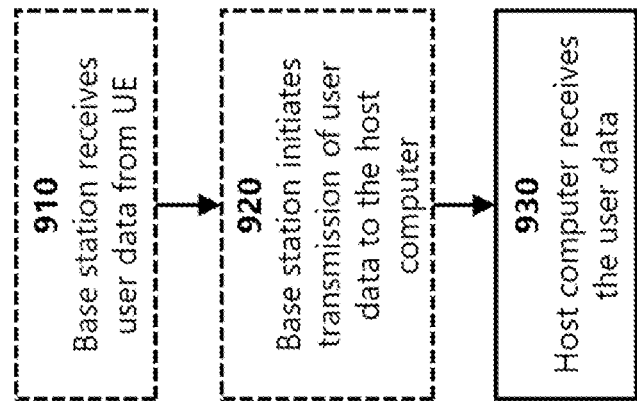
FIG. 19 is a flowchart illustrating a method implemented in a communication system, according to certain embodiments.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| 1x RTT | CDMA2000 1x Radio Transmission Technology |
| 3GPP | 3rd Generation Partnership Project |
| 5G | 5th Generation |
| ABS | Almost Blank Subframe |
| ACK/NACK | Acknowledgment/Non-acknowledgment |
| ARQ | Automatic Repeat Request |
| AWGN | Additive White Gaussian Noise |
| BCCH | Broadcast Control Channel |
| BCH | Broadcast Channel |
| CA | Carrier Aggregation |
| CC | Carrier Component |
| CCCH SDU | Common Control Channel SDU |
| CDMA | Code Division Multiplexing Access |
| CG | Configured Grant |
| CGI | Cell Global Identifier |
| CIR | Channel Impulse Response |
| CP | Cyclic Prefix |
| CPICH | Common Pilot Channel |
| CPICH Ec/No | CPICH Received energy per chip divided by the power density in the band |
| CQI | Channel Quality information |
| C-RNTI | Cell RNTI |
| CSI | Channel State Information |
| DCCH | Dedicated Control Channel |
| DCI | Downlink Control Information |
| DFTS-OFDM | Discrete Fourier Transform Spread OFDM |
| DL | Downlink |
| DM | Demodulation |
| DMRS | Demodulation Reference Signal |
| DRX | Discontinuous Reception |
| DTX | Discontinuous Transmission |
| DTCH | Dedicated Traffic Channel |
| DUT | Device Under Test |
| E-CID | Enhanced Cell-ID (positioning method) |
| E-SMLC | Evolved-Serving Mobile Location Centre |
| ECGI | Evolved CGI |
| eNB | E-UTRAN NodeB |
| ePDCCH | enhanced Physical Downlink Control Channel |
| E-SMLC | evolved Serving Mobile Location Center |
| E-UTRA | Evolved UTRA |
| E-UTRAN | Evolved UTRAN |
| FDD | Frequency Division Duplex |
| GERAN | GSM EDGE Radio Access Network |
| GF | Grant-Free |
| gNB | Base station in NR |
| GNSS | Global Navigation Satellite System |
| GSM | Global System for Mobile communication |
| HARQ | Hybrid Automatic Repeat Request |
| HO | Handover |
| HSPA | High Speed Packet Access |
| HRPD | High Rate Packet Data |
| LOS | Line of Sight |
| LPP | LTE Positioning Protocol |
| LTE | Long-Term Evolution |
| MAC | Medium Access Control |
| MBMS | Multimedia Broadcast Multicast Services |
| MBSFN | Multimedia Broadcast multicast service Single Frequency Network |
| MBSFN ABS | MBSFN Almost Blank Subframe |
| MCS | Modulation and Coding Scheme |
| MDT | Minimization of Drive Tests |
| MIB | Master Information Block |
| MME | Mobility Management Entity |
| MSC | Mobile Switching Center |
| NPDCCH | Narrowband Physical Downlink Control Channel |
| NR | New Radio |
| OCNG | OFDMA Channel Noise Generator |
| OFDM | Orthogonal Frequency Division Multiplexing |
| OFDMA | Orthogonal Frequency Division Multiple Access |
| OSS | Operations Support System |
| OTDOA | Observed Time Difference of Arrival |
| O&M | Operation and Maintenance |
| PBCH | Physical Broadcast Channel |
| P-CCPCH | Primary Common Control Physical Channel |
| PCell | Primary Cell |
| PCFICH | Physical Control Format Indicator Channel |
| PDCCH | Physical Downlink Control Channel |
| PDP | Profile Delay Profile |
| PDSCH | Physical Downlink Shared Channel |
| PGW | Packet Gateway |
| PHICH | Physical Hybrid-ARQ Indicator Channel |
| PLMN | Public Land Mobile Network |
| PMI | Precoder Matrix Indicator |
| PRACH | Physical Random Access Channel |
| PRS | Positioning Reference Signal |
| PSS | Primary Synchronization Signal |
| PUCCH | Physical Uplink Control Channel |
| PUR | Preconfigured Uplink Resources |
| PUSCH | Physical Uplink Shared Channel |
| RACH | Random Access Channel |
| QAM | Quadrature Amplitude Modulation |
| RAN | Radio Access Network |
| RAT | Radio Access Technology |
| RLM | Radio Link Management |
| RNC | Radio Network Controller |
| RNTI | Radio Network Temporary Identifier |
| RRC | Radio Resource Control |
| RRM | Radio Resource Management |
| RS | Reference Signal |
| RSCP | Received Signal Code Power |
| RSRP | Reference Symbol Received Power OR Reference Signal Received Power |
| RSRQ | Reference Signal Received Quality OR Reference Symbol Received Quality |
| RSSI | Received Signal Strength Indicator |
| RSTD | Reference Signal Time Difference |
| SCH | Synchronization Channel |
| SCell | Secondary Cell |
| SDU | Service Data Unit |
| SFN | System Frame Number |
| SGW | Serving Gateway |
| SI | System Information |
| SIB | System Information Block |
| SNR | Signal to Noise Ratio |
| SON | Self Optimized Network |
| SPS | Semi-Persistent Scheduling |
| SUL | Supplemental Uplink |
| SS | Synchronization Signal |
| SSS | Secondary Synchronization Signal |
| TA | Timing Advance |
| TDD | Time Division Duplex |
| TDOA | Time Difference of Arrival |
| TO | Transmission Occasion |
| TOA | Time of Arrival |
| TSS | Tertiary Synchronization Signal |
| TTI | Transmission Time Interval |
| UE | User Equipment |
| UL | Uplink |
| URLLC | Ultra-Reliable and Low-Latency Communications |
| UMTS | Universal Mobile Telecommunication System |
| USIM | Universal Subscriber Identity Module |
| UTDOA | Uplink Time Difference of Arrival |
| UTRA | Universal Terrestrial Radio Access |

| | |
|---|---|
| UTRAN | Universal Terrestrial Radio Access Network |
| WCDMA | Wide CDMA |
| WLAN | Wide Local Area Network |

The invention claimed is:

1. A wireless device for transmitting multiple layers of a physical channel using a discrete Fourier transform (DFT) spread orthogonal frequency division multiplexing (OFDM) (DFT-S-OFDM) uplink waveform, the wireless device comprising processing circuitry operable to:
    transmit to a network node an indication of a capability of the wireless device to operate according to a first mode of operation and a second mode of operation, wherein in the first mode of operation a codebook subset comprises precoding matrices with at most one non-zero elements per column, and in the second mode of operation the codebook subset comprises precoding matrices with at most two non-zero elements per column, and wherein the codebook subset is in a codebook that is designated for use when transform precoding of a physical channel is disabled;
    receive a configuration from the network node for a selected mode of the first mode of operation and the second mode of operation;
    transmit the physical channel using transform precoding and, at least when transmitting with two layers, using the codebook subset comprising the precoding matrices of the selected mode.

2. The wireless device of claim 1, wherein the first mode of operation is associated with a non-coherent codebook and the second mode of operation is associated with one of a non-coherent codebook and a partially-coherent codebook.

3. The wireless device of claim 1, wherein for a third mode of operation the codebook subset further comprises precoding matrices with more than two non-zero elements for use with single layer transmission, the indication transmitted to the network node indicates capability for the third mode of operation, the selected mode is the third mode, and wherein transmitting the physical channel comprises transmitting the physical channel with one layer.

4. A wireless device for multiple antenna transmission using a discrete Fourier transform (DFT) spread orthogonal frequency division multiplexing (OFDM) (DFT-S-OFDM) uplink waveform, the wireless device comprising processing circuitry operable to:
    receive signaling identifying a first and a second subband, wherein the subbands contain contiguous frequency domain resources, and at least a portion of the frequency domain resources of one of the subbands is not contained within the other subband;
    encode and map a set of information bits to the first and the second subband, thereby forming one or more spatial layers according to a mapping of a plurality of antenna ports to the one or more spatial layers; and
    transmit the one or more spatial layers in the subbands and within a same OFDM symbol.

5. The wireless device of claim 4, wherein the processing circuitry is operable to map the set of information bits to the first and the second subband by transform precoding the one or more spatial layers.

6. The wireless device of claim 4, the processing circuitry further operable to receive an allocation of frequency domain resources for the first subband that indicate a starting physical resource block (PRB) index and a number of contiguous PRBs and determine frequency domain resources for the second subband by adding an integer offset to the starting PRB index.

7. The wireless device of claim 4, wherein the first subband is associated with a first set of antenna ports and the second subband is associated with a second set of antenna ports.

8. The wireless device of claim 4, wherein the first subband is associated with a first spatial layer and the second subband is associated with a second spatial layer.

9. The wireless device of claim 4, wherein the wireless device uses a precoder for transmission on a subband of the first and second subband, and when the precoder contains a non-zero element corresponding to a first or a second antenna port, the wireless device transmits with non-zero power on the subband of the first and second subband.

10. The wireless device of claim 4, wherein:
    the wireless device receives one of a first and a second indication conveying one of if the wireless device is to transmit on the first subband and if the wireless device is to transmit on both the first and second subbands, respectively;
    upon receiving the first indication, the wireless device transmits a first spatial layer according to a first antenna port associated with the first subband; and
    upon receiving the second indication, the wireless device transmits two spatial layers in the first and the second subband, respectively, according to the first antenna port associated with the first subband and a second antenna port associated with the second subband, respectively.

11. A network node for receiving multiple layers of a physical channel using a discrete Fourier transform (DFT) spread orthogonal frequency division multiplexing (OFDM) (DFT-S-OFDM) uplink waveform, the network node comprising processing circuitry operable to:
    receive from a wireless device an indication of a capability of the wireless device to operate according to a first mode of operation and a second mode of operation, wherein in the first mode of operation a codebook subset comprises precoding matrices with at most one non-zero elements per column, and in the second mode of operation the codebook subset comprises precoding matrices with at most two non-zero elements per column, and wherein the codebook subset is in a codebook that can be configured when transform precoding of a physical channel is disabled;
    transmit a configuration to the wireless device for a selected mode of the first mode of operation and the second mode of operation; and
    at least when receiving two layers, receive the physical channel according to the use of transform precoding and the codebook subset comprising the matrices of the selected mode.

12. The network node of claim 11, wherein the first mode of operation is associated with a non-coherent codebook and the second mode of operation is associated with one of a non-coherent codebook and a partially-coherent codebook.

13. The network node of claim 11, wherein for a third mode of operation the codebook subset further comprises precoding matrices with more than two non-zero elements for use with single layer transmission, the configuration transmitted to the wireless device is for the third mode of operation, and wherein receiving the physical channel comprises receiving the physical channel with one layer.

14. A network node for receiving a multiple antenna transmission using a discrete Fourier transform (DFT)

spread orthogonal frequency division multiplexing (OFDM) (DFT-S-OFDM) uplink waveform, the network node comprising processing circuitry operable to:

transmit signaling to a wireless device, the signaling identifying a first and a second subband, wherein the subbands contain contiguous frequency domain resources, and at least a portion of the frequency domain resources of one of the subbands is not contained within the other subband; and receive, from the wireless device, a set of encoded information bits mapped to the first and second subband and within a same OFDM symbol according to a mapping of a plurality of antenna ports in the wireless device to one or more spatial layers.

15. The network node of claim 14, wherein the one or more spatial layers are transform precoded by the wireless device to map the set of information bits to the first and second subband.

16. The network node of claim 14, the processing circuitry further operable to transmit to the wireless device an allocation of frequency domain resources for the first subband that indicate a starting physical resource block (PRB) index and a number of contiguous PRBs, wherein the frequency domain resources for the second subband are offset from the starting PRB index by an integer offset.

17. The network node of claim 14, wherein the first subband is associated with a first set of antenna ports in the wireless device and the second subband is associated with a second set of antenna ports in the wireless device.

18. The network node of claim 14, wherein the first subband is associated with a first spatial layer and the second subband is associated with a second spatial layer.

19. The network node of claim 14, wherein the network node transmits one of a first and a second indication comprising one of if the wireless device is to transmit on the first subband and if the wireless device is to transmit on both the first and second subbands, respectively, and wherein:

upon receiving the first indication, the wireless device transmits the one spatial layer according to a first antenna port associated with the first subband; and upon receiving the second indication, the wireless device transmits two spatial layers in the first and the second subband, respectively, according to the first antenna port associated with the first subband and a second antenna port associated with the second subband, respectively.

\* \* \* \* \*